(12) United States Patent
Allard et al.

(10) Patent No.: US 10,093,152 B2
(45) Date of Patent: Oct. 9, 2018

(54) SHROUDED ROOF VENT FOR A VEHICLE

(71) Applicant: DOMETIC SWEDEN AB, Solna (SE)

(72) Inventors: James Allard, Davisburg, MI (US); Mark L. Smith, Buchanan, MI (US); Hari Sunkara, Elkhart, IN (US)

(73) Assignee: Dometic Sweden AB, Solna (SE)

( * ) Notice: Subject to any disclaimer, the term of this patent is extended or adjusted under 35 U.S.C. 154(b) by 1150 days.

(21) Appl. No.: 14/299,903

(22) Filed: Jun. 9, 2014

(65) Prior Publication Data

US 2015/0352924 A1    Dec. 10, 2015

(51) Int. Cl.
*B60H 1/26* (2006.01)
*B60H 1/00* (2006.01)

(52) U.S. Cl.
CPC ......... *B60H 1/262* (2013.01); *B60H 1/00364* (2013.01)

(58) Field of Classification Search
CPC .................................. B60H 1/262; B60H 1/26
USPC ........................................... 454/94, 367, 365
See application file for complete search history.

(56) References Cited

U.S. PATENT DOCUMENTS

| | | |
|---|---|---|
| 536,156 A | 3/1895 | Rice |
| 1,692,073 A | 11/1928 | Brenner |
| 2,372,164 A | 3/1945 | Woodhams |
| 3,016,952 A | 1/1962 | Shero |
| 3,078,781 A * | 2/1963 | Jentoft .................... F24F 7/025 454/355 |
| 3,520,245 A * | 7/1970 | Painter ...................... F24F 7/02 454/358 |
| 3,895,568 A * | 7/1975 | Stone ..................... B60H 1/262 137/533.27 |
| 3,934,383 A | 1/1976 | Perry et al. |
| 4,038,911 A | 8/1977 | Hart |
| 4,300,440 A | 11/1981 | Holter |
| 4,395,939 A | 8/1983 | Hough et al. |
| 4,572,059 A * | 2/1986 | Ramsay .................... F24F 7/02 454/365 |
| 4,615,263 A | 10/1986 | Titterud |
| 4,633,769 A | 1/1987 | Milks |
| 4,759,270 A | 7/1988 | Linden |
| 4,872,722 A | 10/1989 | Farmont |
| 5,137,491 A * | 8/1992 | Ishihara ................. B60H 1/247 454/152 |

(Continued)

FOREIGN PATENT DOCUMENTS

| | | |
|---|---|---|
| AU | 359397 | 12/2014 |
| AU | 359396 | 2/2015 |

(Continued)

OTHER PUBLICATIONS

U.S. Patent and Trademark Office, International Search Report for PCT/US2014/041566, dated Oct. 24, 2014.

(Continued)

*Primary Examiner* — Steven B McAllister
*Assistant Examiner* — Samantha Probst
(74) *Attorney, Agent, or Firm* — Middleton Reutlinger

(57) ABSTRACT

An air vent may cover an opening formed in a structure to block water or debris from entering an interior of the structure through the opening. The air vent is movable between a closed and an open position to selectively block or allow fluid communication between the interior and an exterior of the structure.

20 Claims, 14 Drawing Sheets

(56) References Cited

U.S. PATENT DOCUMENTS

| | | | |
|---|---|---|---|
| 5,374,215 A * | 12/1994 | Crider | B60H 1/262 454/136 |
| 5,407,038 A | 4/1995 | Pedlar | |
| 5,591,080 A * | 1/1997 | Ward | F24F 7/02 454/359 |
| 5,672,101 A | 9/1997 | Thomas | |
| 5,730,583 A | 3/1998 | Alizadeh | |
| 5,797,648 A | 8/1998 | Fiegel et al. | |
| 5,839,229 A | 11/1998 | Briggs et al. | |
| 5,918,972 A * | 7/1999 | Van Belle | B60H 1/262 362/149 |
| 5,984,405 A | 11/1999 | Ciacci | |
| D421,798 S | 3/2000 | Liang | |
| 6,068,551 A * | 5/2000 | Oremland | B60H 1/00014 454/162 |
| 6,179,034 B1 | 1/2001 | Fuss | |
| 6,241,474 B1 | 6/2001 | Alizadeh et al. | |
| D446,295 S | 8/2001 | Williams et al. | |
| 6,347,484 B1 | 2/2002 | Swanger | |
| 6,361,428 B1 * | 3/2002 | Tosconi | B60H 1/262 454/137 |
| 6,438,800 B1 | 8/2002 | Narang et al. | |
| 6,442,896 B1 | 9/2002 | Chapin, III | |
| 6,623,352 B2 * | 9/2003 | Illingworth | B64C 11/001 454/188 |
| 6,695,692 B1 * | 2/2004 | York | E04D 13/0325 454/199 |
| 7,004,832 B2 * | 2/2006 | Thomas | B60H 1/00364 454/129 |
| 7,021,006 B2 | 4/2006 | Farrar et al. | |
| 7,419,368 B2 | 9/2008 | Milks | |
| 7,544,124 B2 * | 6/2009 | Polston | F24F 7/02 454/366 |
| 7,731,574 B2 | 6/2010 | Milks | |
| 7,762,765 B2 | 7/2010 | Milks | |
| D654,920 S | 2/2012 | Wang et al. | |
| 8,177,496 B2 | 5/2012 | Wilson et al. | |
| D723,152 S | 2/2015 | Xu et al. | |
| D725,257 S | 3/2015 | Huang et al. | |
| D726,300 S | 4/2015 | DeFilippis | |
| D734,845 S | 7/2015 | Xu et al. | |
| D736,368 S | 8/2015 | Xu et al. | |
| D742,294 S | 11/2015 | Iancului | |
| 9,399,183 B2 | 7/2016 | McVay et al. | |
| D762,528 S | 8/2016 | Allard et al. | |
| 9,557,072 B2 | 1/2017 | Tolinski et al. | |
| D782,939 S | 4/2017 | Allard et al. | |
| D782,940 S | 4/2017 | Allard et al. | |
| D782,941 S | 4/2017 | Allard et al. | |
| D787,037 S | 5/2017 | Allard et al. | |
| 2003/0012656 A1 | 1/2003 | Cho et al. | |
| 2004/0175270 A1 | 9/2004 | Havel et al. | |
| 2005/0003751 A1 | 1/2005 | Thomas | |
| 2005/0003755 A1 * | 1/2005 | Koessler | F24F 13/08 454/359 |
| 2005/0095972 A1 * | 5/2005 | Haigh | B60H 1/262 454/136 |
| 2005/0180849 A1 | 8/2005 | Chen et al. | |
| 2005/0207894 A1 | 9/2005 | Park | |
| 2006/0025067 A1 * | 2/2006 | Koessler | F24F 7/02 454/359 |
| 2007/0166165 A1 | 7/2007 | Lee | |
| 2008/0139101 A1 | 6/2008 | Bickel et al. | |
| 2008/0156282 A1 | 7/2008 | Aschermann | |
| 2008/0188176 A1 * | 8/2008 | Hunt | E04D 13/17 454/366 |
| 2008/0210409 A1 | 9/2008 | Saksager | |
| 2009/0053990 A1 * | 2/2009 | McKee | F24F 7/02 454/250 |
| 2009/0155076 A1 | 6/2009 | Jarrah | |
| 2010/0056035 A1 | 3/2010 | Hua | |
| 2010/0068060 A1 | 3/2010 | Ota et al. | |
| 2010/0260630 A1 | 10/2010 | Bilodeau et al. | |
| 2011/0135494 A1 | 6/2011 | Nicgorski et al. | |
| 2011/0236211 A1 | 9/2011 | Schneider et al. | |
| 2011/0294412 A1 * | 12/2011 | Vagedes | F24F 7/02 454/242 |
| 2012/0224988 A1 | 9/2012 | Maier et al. | |
| 2012/0244000 A1 | 9/2012 | Turcas | |
| 2013/0147312 A1 | 6/2013 | Qin et al. | |
| 2013/0323062 A1 | 12/2013 | Henner et al. | |
| 2014/0030104 A1 | 1/2014 | Lee et al. | |
| 2014/0056710 A1 | 2/2014 | Henner et al. | |
| 2014/0119922 A1 | 5/2014 | Nakano et al. | |
| 2014/0295746 A1 * | 10/2014 | Chagnon | B60H 1/00371 454/75 |
| 2014/0334952 A1 | 11/2014 | Ziegler et al. | |
| 2015/0064011 A1 | 3/2015 | Xu et al. | |
| 2015/0078937 A1 | 3/2015 | Crevel et al. | |
| 2015/0140916 A1 * | 5/2015 | Bickel | B60H 1/262 454/136 |
| 2015/0352924 A1 | 12/2015 | Allard et al. | |
| 2016/0200174 A1 | 7/2016 | Tremer et al. | |
| 2016/0221418 A1 * | 8/2016 | Stover | B60H 1/245 |

FOREIGN PATENT DOCUMENTS

| | | |
|---|---|---|
| AU | 367696 | 3/2016 |
| AU | 367699 | 3/2016 |
| AU | 367700 | 3/2016 |
| AU | 367701 | 3/2016 |
| CA | 159763 | 11/2014 |
| CA | 166627 | 4/2016 |
| CA | 166057 | 9/2016 |
| CA | 170268 | 9/2016 |
| CN | 2014305061869 | 12/2014 |
| DE | 19607931 | 2/1998 |
| EP | 002591586 | 2/2015 |
| EP | 002919936 | 12/2015 |
| WO | 2015191029 | 12/2015 |

OTHER PUBLICATIONS

Transmittal Letter of Related Cases.
Canadian Patent Application No. 2,951,956 entitled "Shrouded Roof Vent for a Vehicle" entered national stage on Dec. 9, 2016.
Canadian Design Patent Application No. 174116 entitled "Roof Fan Shroud" filed Apr. 11, 2017.
U.S. Appl. No. 15/198,697 entitled "Compact Fan for a Recreational Vehicle" filed Jun. 30, 2016.
U.S. Appl. No. 15/292,239 entitled "Roof Fan Assembly" filed Oct. 13, 2016.
Design U.S. Appl. No. 29/580,801 entitled "Roof Fan Shroud" filed Oct. 13, 2016.
Design U.S. Appl. No. 29/588,249 entitled "Fan" filed Dec. 19, 2016.
Fantastic® Vent Fan with fan blade Model No. 8138-81 dated Feb. 13, 2015.
MaxxAir Fans, MaxxFan 4301K and 4401K; Jan. 22, 2016.
Dometic Product Catalog 2016, Fan-Tastic Vent Models; EZ-Breeze; Ultra Breeze. pp. 90-91. 2016.

* cited by examiner

SHROUDED ROOF VENT FOR A VEHICLE

CROSS-REFERENCE

Cross-reference is made to U.S. Design patent application No. 29/493,405 entitled "Vent Housing," which is filed on the same day as the present application and is expressly incorporated herein by reference.

BACKGROUND

The present disclosure is related to air vents. More specifically, the present disclosure is related to air vents configured to selectively block or allow fluid communication between an interior and an exterior of a structure, such as a vehicle, for example.

It may be advantageous to circulate air through an enclosed area of a structure such as a building or vehicle. The structure may include an opening to permit airflow between an interior and an exterior of the structure to vent the enclosed area to an external environment, such as an ambient environment, for example. The opening may be partially covered to block debris and precipitation, such as rain and snow, for example, from entering the interior of the structure through the opening. The structure may include an air vent to selectively permit air to flow freely between the interior and exterior of the structure to vent the enclosed area.

As an example, recreational vehicles may include an air vent to cover an opening formed in the roof of the vehicle. The air vent may be configured to selectively allow air to circulate between the interior and exterior of the vehicle. In some instances, the air vent is closed during inclement weather to avoid precipitation from entering the vehicle. A hood may be installed over such an air vent to allow the air vent to be open during inclement weather. However, adding a hood to the vehicle increases cost and assembly time. Some air vents include a relatively large number of parts and, thus, have a relatively long assembly time. Therefore, there is a need for an air vent that has a relatively short assembly time and does not require a hood to block precipitation and debris from entering the vehicle through the air vent when the air vent is open in inclement weather.

SUMMARY

The present application discloses one or more of the features recited in the appended claims and/or the following features which, alone or in any combination, may comprise patentable subject matter:

According to an aspect of the present disclosure, an air vent may include a cover and a damper. The cover may be configured to be received in an opening formed in a vehicle. The cover may include a continuous ceiling and a number of sidewalls extending downward away from the ceiling. The ceiling and sidewalls may cooperate to define an interior region and a plate-receiving opening that opens into the interior region. The cover may be formed to define a vent opening that opens into the interior region. The vent opening may be transverse to the plate-receiving opening. The interior region, plate-receiving opening, and the vent opening may cooperate to define a passage for air to communicate between an interior and an exterior of the vehicle. The damper may be positioned in the interior region. The damper may be selectively moveable between a closed position blocking fluid communication through the passage and an open position allowing fluid communication through the passage.

In some embodiments, the air vent may further include an interior plate positioned in the interior region. The interior plate and the cover may cooperate to define a damper chamber. The damper may be pivotably coupled to the interior plate. The damper may be positioned in the damper chamber.

In some embodiments, at least one sidewall may be formed to define an outlet opening in fluid communication with the vent opening and the interior region. In some embodiments, the cover may include an outlet coupled to the sidewall to cover the outlet opening and the outlet may be formed to define the vent opening.

In some embodiments, the outlet may include an awning and a vent grill. The awning may include a flap, tab ends, and a grill retainer. The vent grill may be coupled to the flap and the grill retainer.

In some embodiments, the flap may include a fixed end coupled to the at least one sidewall at a pivot joint and a free end extending away from the sidewall. The free end may be pivotable about the pivot joint. The vent grill may be configured to couple to the grill retainer and the free end of the flap to maintain the flap in a stationary position.

In some embodiments, the ceiling, the sidewalls, and the awning may be monolithically formed. In some embodiments, the vent grill may be formed to define the vent opening.

In some embodiments, the damper may include a slat movable between a first position blocking fluid communication through the passage and a second position allowing fluid communication through the passage. In some embodiments, at least one sidewall may be formed to define an outlet opening in fluid communication with the passage. The slat may cover the outlet opening in the first position and uncover the outlet opening in the second position.

In some embodiments, the slat may be configured to be maintained in a number of positions between the first and second positions. In some embodiments, the damper may include a driver coupled to the slat. The driver may be configured to selectively move the slat between the first and second positions.

In some embodiments, the air vent may include an interior plate sized to be received in the interior region to cover the plate-receiving opening. The slat may be pivotably coupled to the interior plate. The driver may include a crank and a rod coupled to the crank and the slat. The crank may be configured to rotate such that the rod engages the slat to pivot the slat relative to the interior plate between the first and second positions.

In some embodiments, the crank may be driven manually. In some embodiments, the crank may be driven by a motor.

In some embodiments, the air vent may include a controller coupled to the motor and a user interface in communication with the controller. The user interface may be configured to receive user input indicative of a desired position of the damper. The controller may be configured to operate the motor.

In some embodiments, the air vent may include a fan assembly configured to force air between the interior and exterior of the vehicle through the passage. In some embodiments, the fan assembly may be positioned in the damper chamber.

According to another aspect of the present disclosure, an air vent may include a cover, an interior plate, and a damper. The cover may include a continuous ceiling and a number of sidewalls extending from the ceiling. The number of sidewalls may be formed to define a first outlet opening. The interior plate may be coupled to the cover. The interior plate and the cover may cooperate to define a damper chamber. The interior plate may be formed to define a screen-receiving opening that opens into the damper chamber. The first outlet opening may open into the damper chamber. The screen-receiving opening may be transverse to the first outlet opening. The damper may be coupled to the interior plate and positioned in the damper chamber. The damper may be selectively moveable between a closed position blocking fluid communication through the first outlet opening and an open position allowing fluid communication through the first outlet opening.

In some embodiments, the damper may include a first slat and a driver. The first slat may be configured to move between a first position covering the first outlet opening when the damper is in the closed position and a second position uncovering the first outlet opening when the damper is in the open position. The driver may be coupled to the first slat and configured to move the first slat between the first and second positions.

In some embodiments, the cover may include a first outlet coupled to one of the sidewalls to cover the first outlet opening. The first outlet may include an air permeable vent grill removably coupled to the sidewall and a water impermeable awning coupled to the cover and the vent grill. The awning may extend away from the sidewall to block precipitation and debris from entering the first outlet opening.

In some embodiments, the number of sidewalls may be formed to define a second outlet opening. The damper may include a second slat. The second slat may be configured to move between a first position covering the second outlet opening when the damper is in the closed position and a second position uncovering the second outlet opening when the damper is in the open position.

In some embodiments, the first and second slats may be configured to be maintained in a number of positions between the first and second positions. In some embodiments, the driver may be coupled to the second slat and configured to move the second slat between the first and second positions.

In some embodiments, the cover may include a second outlet coupled to one of the sidewalls to cover the second outlet opening. The second outlet may include an air permeable vent grill removably coupled to the sidewall and a water impermeable awning coupled to the cover and the vent grill. The awning may extend away from the sidewall to block precipitation and debris from entering the second outlet opening.

According to another aspect of the present disclosure, an air vent comprises a cover, a plate, and a damper. The cover is configured to be received in an opening formed in a vehicle. The cover includes a continuous ceiling and a number of sidewalls extending downward away from the ceiling. The ceiling and sidewalls cooperate to define an interior region and a plate-receiving opening that opens into the interior region. The cover is formed to define a vent opening that opens into the interior region. The interior region, plate-receiving opening, and the vent opening cooperate to define a passage for air to communicate between an interior and an exterior of the vehicle. The plate is positioned in the plate receiving opening and includes a central opening and at least one peripheral opening. The damper is positioned in the interior region and selectively moveable between a closed position blocking fluid communication through the vent opening and an open position allowing fluid communication through the vent opening. When the damper is in the closed position, fluid communication is permitted through the interior region between the central opening and the at least one peripheral opening.

In some embodiments, the damper includes a first slat and a driver, the first slat is configured to move between a first position covering the first outlet opening when the damper is in the closed position and a second position uncovering the first outlet opening when the damper is in the open position, and the driver is coupled to the first slat and configured to move the first slat between the first and second positions.

In some embodiments, the cover further includes a first outlet coupled to one of the sidewalls to cover the first outlet opening, the first outlet includes an air permeable vent grill removably coupled to the sidewall and a water impermeable awning coupled to the cover and the vent grill, and the awning extends away from the sidewall to block precipitation and debris from entering the first outlet opening.

In some embodiments, the number of sidewalls are formed to define a second outlet opening, the damper includes a second slat, the second slat is configured to move between a first position covering the second outlet opening when the damper is in the closed position and a second position uncovering the second outlet opening when the damper is in the open position.

In some embodiments, the first and second slats are configured to be maintained in a number of positions between the first and second positions.

In some embodiments, the driver is coupled to the second slat and configured to move the second slat between the first and second positions.

In some embodiments, the cover further includes a second outlet coupled to one of the sidewalls to cover the second outlet opening, the second outlet includes an air permeable vent grill removably coupled to the sidewall and a water impermeable awning coupled to the cover and the vent grill, and the awning extends away from the sidewall to block precipitation and debris from entering the second outlet opening.

In some embodiments, the wherein the slat includes a guide that engages with the opening to position the slat when the damper is in the closed position.

In some embodiments, the damper further includes a gasket that is positioned adjacent the guide, the gasket positioned between a surface of the slat and the sidewall to provide a seal.

In some embodiments, when the damper is in the closed position, the surface of the slat is spaced apart from the sidewall.

In some embodiments, the slat is formed to include a stand-off that engages the plate when the damper is in the fully opened position.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
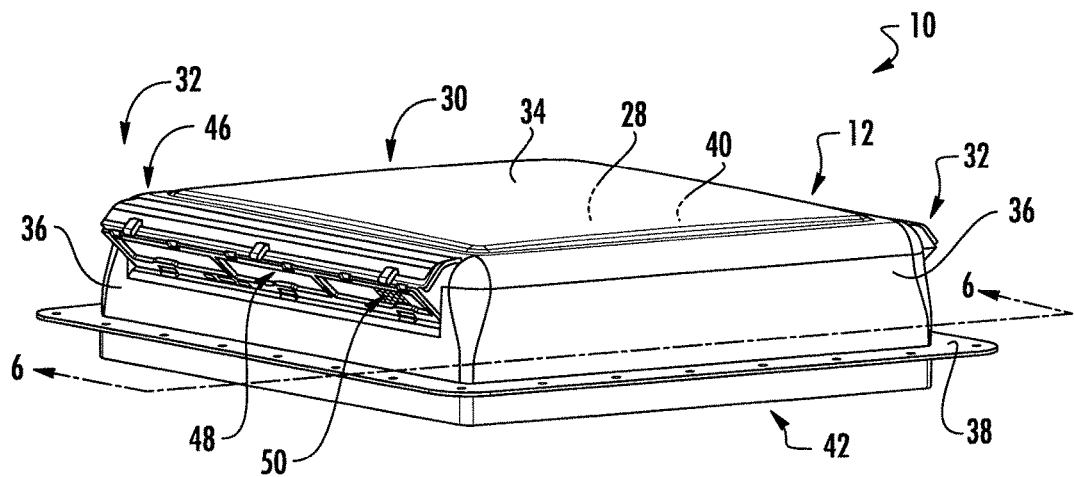
FIG. 1 is a perspective view of an air vent in accordance with the present disclosure, the air vent is configured to cover an opening formed in a structure, such as a recreational vehicle or building, for example, to selectively block or allow air circulation between an interior and an exterior of the structure while blocking precipitation and debris from entering the interior through the opening.
Figure 2:
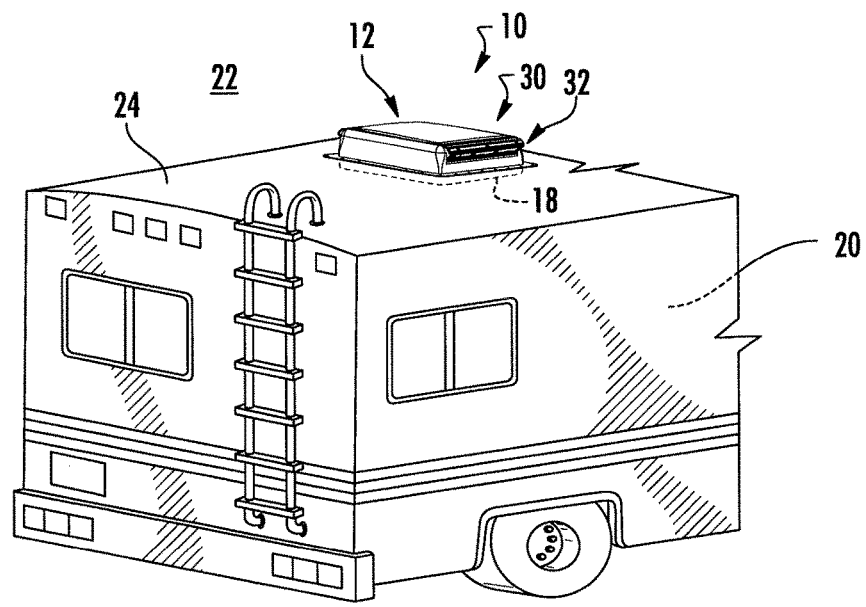
FIG. 2 is a perspective view of the air vent of FIG. 1 installed in an opening formed in a roof of a recreational vehicle to selectively block or allow air circulation between an interior and an exterior of the recreational vehicle while blocking precipitation and debris from entering the interior through the opening formed in the roof.

An air vent 10 in accordance with the present disclosure is shown in FIG. 1. In some applications, a recreational vehicle 24 or another structure, such as a building, for example, is formed to include an opening 18 to allow air to circulate between an interior 20 and an exterior 22 of the vehicle 24 as suggested in FIG. 2. It may be desired for air, but not water or debris, to pass freely between the interior 20 and the exterior 22 of the vehicle 24 through the opening 18. The air vent 10 covers the opening 18 to selectively block or allow fluid communication of air between the interior 20 and the exterior 22 of the vehicle 24 while blocking water or debris from entering the interior 20 through the opening 18 when the air vent 10 is in both an open and closed position.

Figure 3:
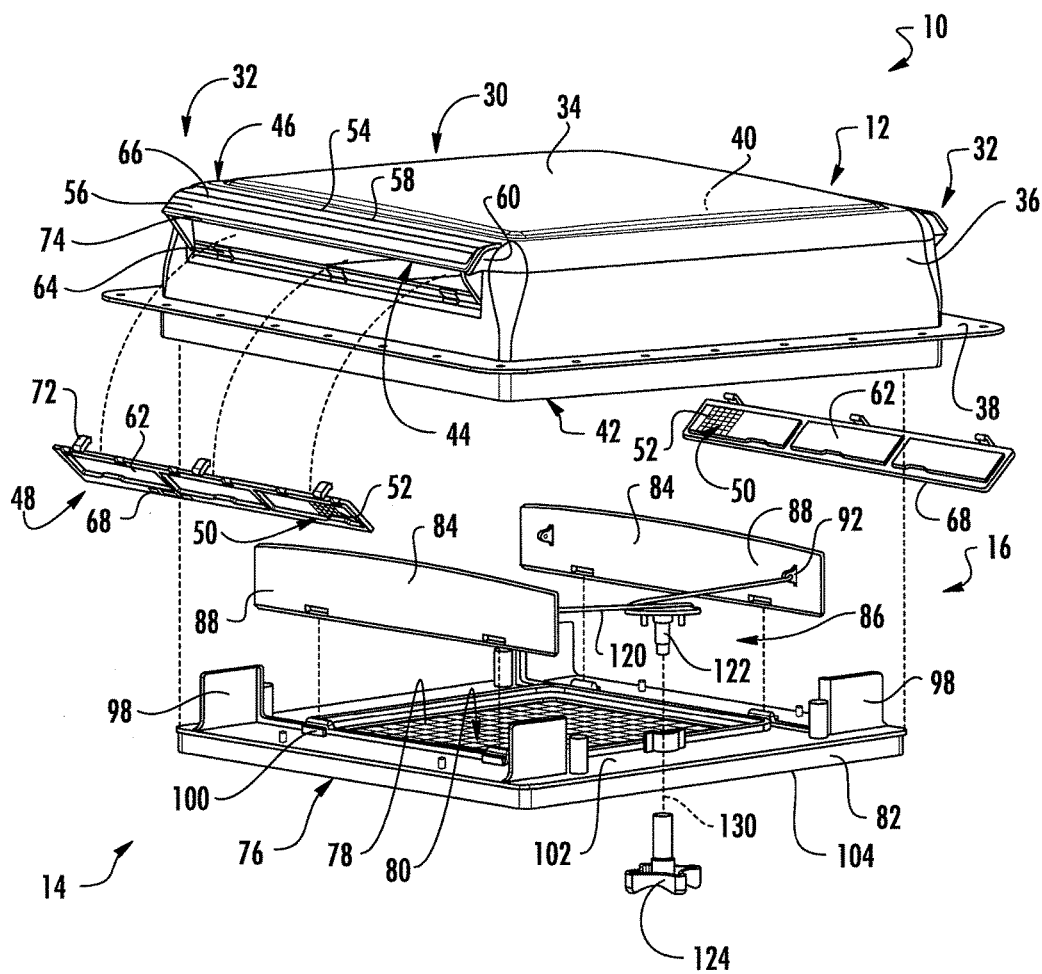
FIG. 3 is an exploded view of the air vent of FIGS. 1 and 2 showing that the air vent includes a cover, an interior plate, and a damper, the cover configured to be received in the opening to block precipitation and debris from entering the recreational vehicle through the opening and to provide a passage for air to move between the interior and the exterior of the recreational vehicle, the interior plate is configured to cooperate with the cover to define a damper chamber sized to receive the damper, and the damper is configured to selectively block or allow fluid communication through the passage to control air circulation between the interior and the exterior of the vehicle.
Figure 6:
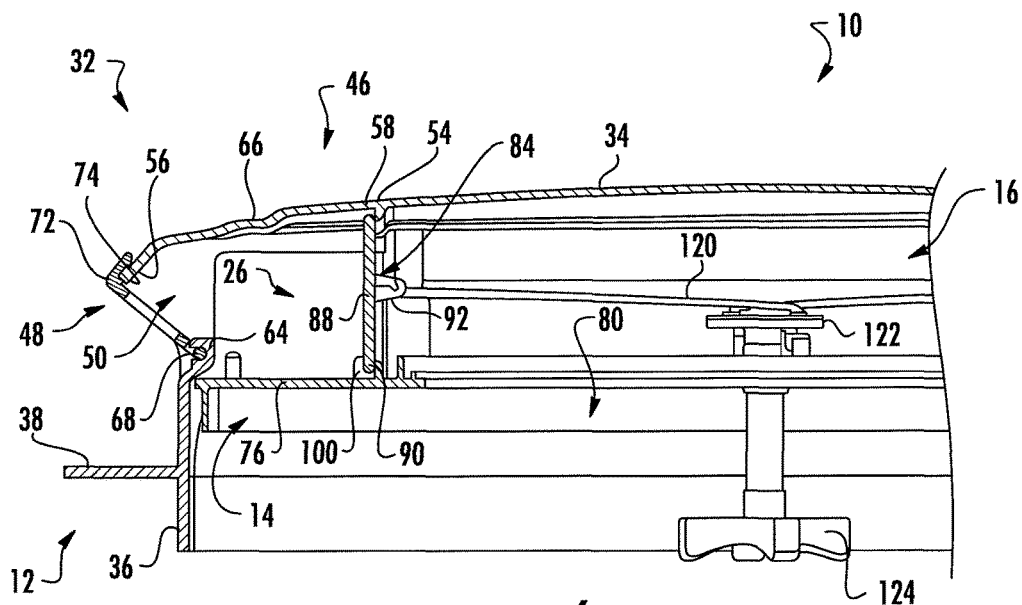
FIG. 6 is a cross-section view taken along line 6-6 of FIG. 1 showing the damper in the closed position to block fluid communication between the interior and exterior of the vehicle.
Figure 7:
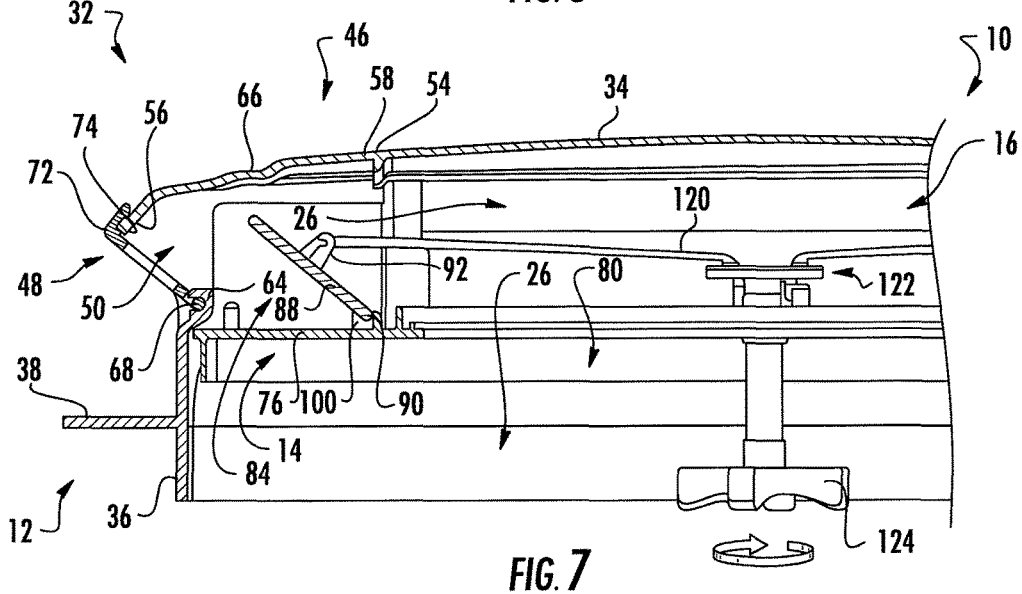
FIG. 7 is a cross-section view taken along line 6-6 of FIG. 1 showing the damper in the open position to allow fluid communication between the interior and exterior of the vehicle.

The air vent 10 includes a cover 12, an interior plate 14, and a damper 16 as shown in FIG. 3. The cover 12 is received in the opening 18 to block water or debris from entering the vehicle 24 through the opening 18 and to provide a passage 26 to allow air to move between the interior 20 and the exterior 22 of the vehicle 24. The interior plate 14 is received in the cover 12 and cooperates with the cover 12 to define a damper chamber 28 sized to receive a portion of the damper 16. The damper 16 is movable between a closed, or blocked position, as shown in FIG. 6, and an open position, as shown in FIG. 7, to allow air to move through the passage 26. The position of the damper 16 is movable to a plurality of positions between the closed position of FIG. 6 and the fully open position of FIG. 7 to control air circulation between the interior 20 and the exterior 22.

Figure 4:
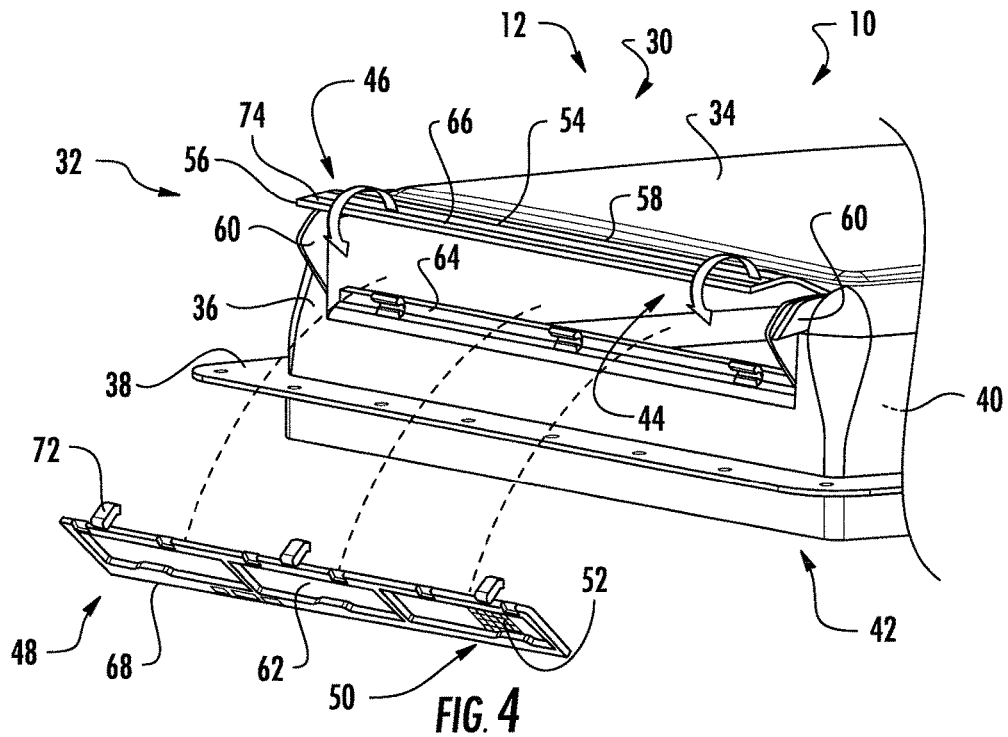
FIG. 4 is a perspective view of a portion of the air vent of FIG. 1 showing an awning and a vent grill included in the cover, the awning configured to be pivoted downward, and the vent grill configured to couple to the cover to maintain the awning in position.
Figure 5:
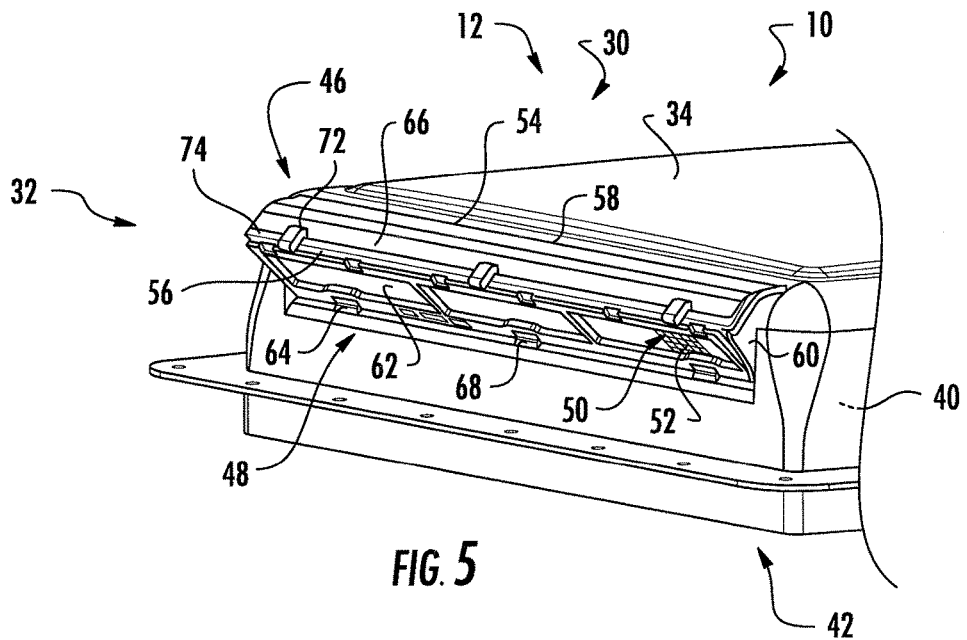
FIG. 5 is a perspective view similar to FIG. 4 showing the vent grill coupled to the awning to maintain the awning in the pivoted position.

The cover 12 includes a frame 30 and outlets 32 as shown in FIGS. 3-5. The frame 30 covers the opening 18 to block water or debris from entering the vehicle 24 through the opening 18. The outlets 32 are coupled to the frame 30 and form a portion of the passage 26 to allow fluid communication between the interior 20 and the exterior 22 of the vehicle 24. The outlets 32 block water or debris from entering the vehicle 24 through the passage 26. In the illustrative embodiment, the cover includes two outlets 32.

The frame 30 may comprise an air and water impermeable material to block air, water, and debris, for example, from entering the vehicle 24 through the opening 18 as shown in FIGS. 3-5. The frame 30 may comprise metal or a suitable plastic material, for example. The frame 30 includes a ceiling 34, a number of sidewalls 36 extending downward from ceiling 34, and a skirt 38 coupled to the sidewalls 36. The ceiling 34 is sized to cover the opening 18. In the illustrative embodiment, the ceiling 34 is generally rectangular, continuous, and dome shaped.

The sidewalls 36 are formed to define an interior region 40 and a plate-receiving opening 42 that opens in to the interior region 40 as shown in FIG. 3. The plate-receiving opening 42 is sized to receive the interior plate 14 and the damper 16. At least one sidewall 36 is formed to include an outlet opening 44. The outlet opening 44 opens into the interior region 40. The interior region 40, outlets 32, and interior plate 14 cooperate to define the passage 26.

As shown in FIG. 1, the sidewalls 36 are formed to include two outlet openings 44. The two outlet openings 44 may allow a draft to pass through the interior region 40 to encourage air circulation between the interior 20 and the exterior 22 of the vehicle 24. In other embodiments, the sidewalls 36 are formed to include more than two outlet openings 44. The more than two outlet openings 44 may increase the draft passing through the interior region 40 and thereby increase the circulation between the interior 20 and the exterior 22. In other embodiments, the sidewalls 36 are formed to include a single outlet opening 44. Circulation between the interior 20 and the exterior 22 may also be induced due to a stack effect caused by pressure differences between the interior 20 and the exterior 22. The pressure differences may be produced naturally or by a fan assembly.

The skirt 38 is coupled to the sidewalls 36 and extends outward away from the sidewalls 36 as shown in FIGS. 3-5. The skirt 38 engages the vehicle 24 to block the air vent 10 from passing through the opening 18. The skirt 38 couples the air vent 10 to the vehicle 24 to maintain the air vent 10 in position relative to the vehicle 24 as suggested in FIG. 2. Water and debris are blocked from entering the interior 20 of the vehicle 24 through the opening 18 via the interface between the skirt 38 and the vehicle 24. In some embodiments, the skirt 38 includes a weatherproof seal. In other embodiments, a weatherproof seal is positioned between the skirt 38 and the vehicle 24.

The outlets 32 are coupled to the frame 30 to cover the outlet openings 44 as shown in FIG. 3. Each outlet opening 44 is covered by an outlet 32. The outlets 32 allow air to communicate between the exterior 22 and the damper chamber 28 and, thus, the interior 20 when the damper 16 is in the open position as suggested in FIG. 7. The outlets 32 include an awning 46 and a vent grill 48 as shown in FIG. 3. The awning 46 is coupled to the sidewall 36 of the frame 30 and forms a rain covering over the vent grill 48 to block water or debris from entering the damper chamber 28 via the outlet opening 44. The vent grill 48 is formed to include a vent opening 50 to allow air to communicate between the interior 20 and the exterior 22. In the illustrative embodiment, the awning 46 and the frame 30 are monolithically formed. Monolithically forming the awning 46 and the frame 30 reduces one or more of the manufacture time, number of parts, assembly time, and cost of the cover 12. In other embodiments, the awning 46 and the frame 30 may be formed from a number of parts.

The awning 46 is coupled to the sidewall 36 and includes a flap 66, two end tabs 60, and a grill retainer 64 as shown in FIGS. 4 and 5. In the illustrative embodiment, the flap 66 is air and water impermeable. The flap 66 includes a fixed end 54, a free end 56, and a lip 74. The fixed end 54 is coupled to the sidewall 36 of the frame 30 above the outlet opening 44 along a pivot joint 58. The free end 56 is spaced apart from the fixed end 54 such that the flap 66 forms a cantilever. The lip 74 is coupled to the free end 56 and extends upwardly away from the free end 56. The free end 56 is pivoted downwardly about the pivot joint 58 and the vent grill 48 engages the lip 74 to maintain the flap 66 in a pivoted position as suggested in FIGS. 4 and 5. The flap 66 is held in the pivoted position to form the roof covering over the vent grill 48 and the outlet opening 44 to block water or debris from entering the damper chamber 28 via the vent grill 48 or the outlet opening 44.

The end tabs 60 are coupled to the sidewall 36 on both sides of the outlet opening 44 as shown in FIGS. 4 and 5. In the illustrative embodiment, the end tabs 60 are air and water impermeable. The end tabs 60 extend away from the sidewall 36 and engage the flap 66 and the vent grill 48. The end tabs 60, flap 66, and vent grill 48 cooperate to form a housing surrounding the outlet opening 44 to block water or debris from entering the outlet opening 44.

The grill retainer 64 is coupled to the sidewall 36 and extends along a bottom of the outlet opening 44 as shown in FIGS. 4 and 5. The grill retainer 64 is configured to pivotably couple to the vent grill 48 such that the vent grill 48 may pivot relative to the frame 30.

The vent grill 48 is formed to define the vent opening 50 to allow air to communicate between the exterior 22 and the damper chamber 28 as shown in FIG. 5. The vent grill 48 is coupled to the awning 46 to cover the outlet opening 44 and to maintain the awning 46 in a stationary position after the flap 66 has been pivoted downward. The vent grill 48 includes a face 62, awning tabs 72, and frame pins 68. The face 62 is formed to define the vent opening 50 to allow air to circulate between the interior 20 and the exterior 22 via the passage 26. The awning tabs 72 couple the vent grill 48 to the flap 66 of the awning 46. The frame pins 68 couple the vent grill 48 to the grill retainer 64.

The face 62 covers the outlet opening 44 as shown in FIG. 5. The face 62 is generally flat and air and water impermeable to block water or debris from entering the interior 20 via the outlet opening 44. The face 62 engages the awning 46 to form a weather blocking seal between the vent grill 48 and the awning 46. The face 62 is formed to include the vent opening 50 to allow air to communicate between the exterior 22 and the interior 20 via the passage 26. In the illustrative embodiment, the vent opening 50 is covered by an air permeable vent 52. While shown as only partially covering the opening 50 in FIG. 3, it should be understood that the air permeable vent 52 may extend over the entire opening 50. The vent 52 may be an air permeable mesh or plastic grill. In some embodiments, the face 62 is generally mesh and air permeable. The face 62 is angled downward relative to the sidewall 36 of the frame 30. In the illustrative embodiment, the face 62 and the frame 30 form about a 45 degree angle.

The awning tabs 72 are coupled to the face 62 and engage the lip 74 of the flap 66 when the flap 66 is pivoted downward as suggested in FIGS. 4 and 5. When the vent grill 48 is coupled to the awning 46, the awning tabs 72 engage the lip 74 to block the flap 66 from pivoting upward and, as such, maintain the flap 66 in a stationary position.

The frame pins 68 are formed in the face 62 and engage the grill retainer 64 of the awning 46 to couple the vent grill 48 to the awning 46. When the frame pins 68 are received by the grill retainer 64 and the awning tabs 72 are not engaged with the lip 74, the vent grill 48 is free to pivot relative to the frame 30. When the frame pins 68 are received by the grill retainer 64 and the awning tabs 72 are engaged with the lip 74, the vent grill 48 is maintained in a stationary position relative to the awning 46 and the frame 30.

The interior plate 14 is received in the interior region 40 formed in the cover 12 and cooperates with the cover 12 to define the damper chamber 28 as shown in FIGS. 6 and 7. The interior plate 14 includes a base 76 and a screen 78. The base 76 couples to the frame 30 to maintain the interior plate 14 in position relative to the frame 30. The screen 78 allows fluid communication between the interior 20 and the damper chamber 28.

The base 76 is sized to be received in the plate-receiving opening 42 to cover the plate-receiving opening 42. The base 76 includes a body 82, a number of frame couplers 98, and a damper retainer 100. The body 82 supports the frame couplers 98, damper retainer 100, and screen 78. The frame couplers 98 couple the base 76 to the frame 30. The damper retainer 100 couples the damper 16 to the body 82.

The body 82 is sized to be received in the plate-receiving opening 42 and engages the sidewalls 36 as shown in FIG. 3. The body 82 is formed to define a screen-receiving opening 80 sized to receive the screen 78. The body 82 is generally flat and includes an upper surface 102 and a lower surface 104. The upper surface 102 is coupled to the frame couplers 98 and the damper retainer 100. The lower surface 104 is generally continuous.

The frame couplers 98 are coupled to the body 82 and extend upward away from the body 82 as shown in FIG. 3. The frame couplers 98 couple the interior plate 14 to the cover 12. The frame couplers 98 space the base 76 apart from the ceiling 34 of the cover 12 so that the damper chamber 28 is properly sized to receive the damper 16.

The damper retainer 100 is coupled to the body 82 as shown in FIG. 3. The damper retainer 100 is pivotably coupled to slats 84 included in the damper 16. The damper retainer 100 is formed to define a through hole sized to receive a driver 86 included in the damper 16.

The screen 78 mates with the body 82 to cover the screen-receiving opening 80. The screen 78 is air permeable to allow air to communicate between the interior 20 and the damper chamber 28. In some embodiments, the screen 78 comprises a mesh material. In some embodiments, the screen 78 comprises a metal or plastic material. When the damper 16 is in the open position, air is allowed to circulate between the interior 20 and the exterior 22 through the passage 26 by passing through the screen 78, damper chamber 28, and vent opening 50 as shown in FIG. 7.

The damper 16 selectively blocks or allows circulation between the interior 20 and the exterior 22 by blocking or allowing air to pass through the passage 26 as suggested in FIGS. 6 and 7. The damper 16 is sized to be received in the plate-receiving opening 42 and is positioned in the damper chamber 28. The damper 16 is movable between the open position and the closed, or blocking position. In the open position, air is allowed to circulate between the interior 20 and the exterior 22 via the air vent 10. In the closed position, air is blocked from circulating between the interior 20 and the exterior 22 via the air vent 10. The damper 16 is configured to be maintained in a number of open positions between a fully open position and a fully closed position to thereby regulate the airflow. In the illustrative embodiment, the damper 16 is configured to be maintained in an infinite number of open positions between the fully open position and the fully closed position. In other embodiments, the damper 16 is configured to be maintained in a discrete number of open positions.

The damper 16 includes slats 84 and a driver 86 as shown in FIG. 3. The slats 84 are movable between an upright position to block air from moving through the passage 26 and an angled position to allow air to move through the passage 26 as suggested in FIGS. 6 and 7. The driver 86 is operated by a user to selectively move the slats 84 between the upright and angled positions. In the illustrative embodiment, the damper 16 includes two slats 84 and a single slat 84 is used in conjunction with each outlet opening 44. The slats 84 are substantially similar and, as such, only a single slat 84 will be described in detail.

The slat 84 is in the upright position when the damper 16 is in the closed position as shown in FIG. 6. The slat 84 is in the angled position when the damper 16 is in the open position as suggested in FIG. 7. The slat 84 is air and water impermeable and sized to cover the outlet opening 44. In the upright position, the slat 84 covers the outlet opening 44 and blocks air from moving between the interior 20 and the exterior 22 through the passage 26. In the angled position, at least a portion of the slat 84 is moved away from the outlet opening 44 to uncover the outlet opening 44 and air is allowed to move between the interior 20 and the exterior 22 through the passage 26. The slat 84 is configured to be maintained in a number of positions between the upright and angled positions to thereby regulate the airflow.

The slat 84 includes a wall 88, pins 90, and rod joints 92 as shown in FIG. 3. The wall 88 is air and water impermeable and sized to completely cover the outlet opening 44. The pins 90 pivotably couple the slat 84 to the damper retainer 100. One of the rod joints 92 couple the slat 84 to the driver 86 so that the driver 86 may push and pull the slat 84 to selectively move the slat 84 between the upright and angled positions.

The driver 86 is configured to be rotated in a first direction to move the slats 84 to the upright position when the damper 16 is in the closed position as suggested in FIG. 6. The driver 86 is configured to be rotated in a second direction to move the slats 84 to the angled position when the damper 16 is in the open position as suggested in FIG. 7. The driver 86 is rotatable to move and maintain the slats 84 in a number of positions between a fully angled position and the upright position to thereby regulate the airflow. In the illustrative embodiment, the driver 86 is rotatable to maintain the slats 84 in an infinite number of positions between the fully angled position and the upright position. In other embodiments, the driver 86 is rotatable to maintain the slats 84 in a discrete number of angled positions.

The driver 86 includes a number of rods 120, a crank 122, and a handle 124 as shown in FIG. 3. The rods 120 are pivotably coupled to the rod joints 92 and the crank 122 as shown in FIG. 6. The crank 122 is configured to rotate about a crank axis 130 to move each rod 120 toward or away from the corresponding outlet opening 44 as suggested in FIGS. 6 and 7. When the crank 122 is rotated to move each rod 120 away from the corresponding outlet opening 44, the corresponding slat 84 pivots toward the upright position and the damper 16 moves toward the closed position as shown in FIG. 6. When the crank 122 is rotated to move each rod 120 toward the corresponding outlet opening 44, the corresponding slat 84 pivots toward the fully angled position and the damper 16 moves toward the fully open position as shown in FIG. 7. The handle 124 is coupled to the crank 122 and extends through the though hole formed in the interior plate 14 and into the interior 20. The handle 124 is gripped by a user and rotated to rotate the crank 122 about the crank axis 130 to move the damper 16 between the fully open and closed positions.

Figure 8:
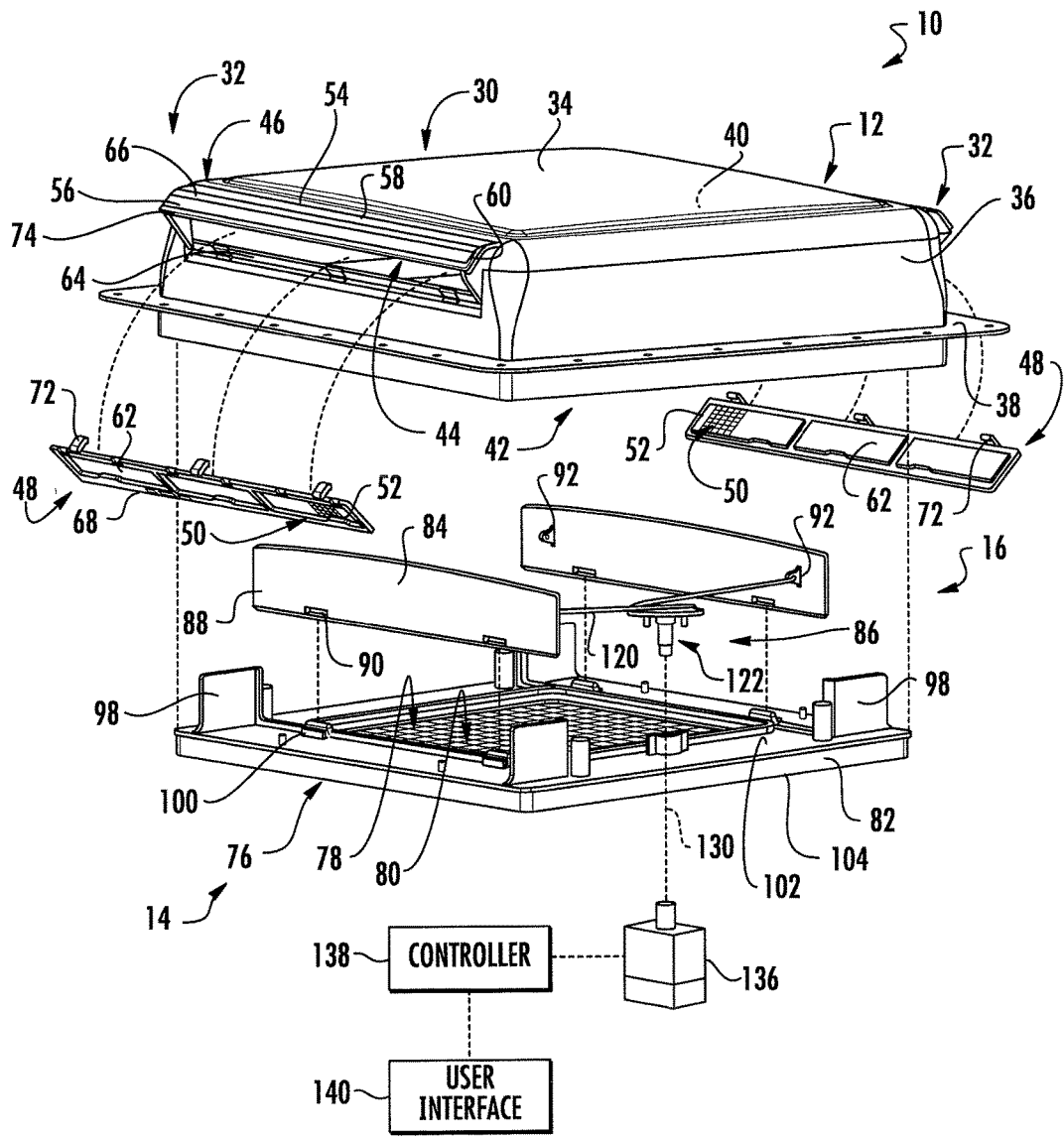
FIG. 8 is an exploded view of another embodiment of an air vent in accordance with the present disclosure, the air vent including a damper having a motor, a controller, and a user interface, the user interface configured to receive user input indicative of a desired position of the damper, the controller operable to control the motor, and the motor configured to open and close the damper.

In some embodiments, the damper 16 includes a motor 136, a controller 138, and a user interface 140 as shown in FIG. 8. The motor 136 is coupled to the crank 122 and configured to rotate the crank 122 to move the damper 16 between the open and closed position. The user interface 140 is operable to accept a user input indicative of a desired position of the damper 16. A signal from the user interface 140 is received by the controller 138. The controller 138 is operable to control the motor 136 to cause the motor 136 to rotate the crank 122 to move the damper 16 between the open and closed position. In some embodiments, the user interface 140 is a toggle switch. In some embodiments, the toggle switch is located on the air vent 10. In other embodiments, the toggle switch is located on a dashboard of the recreational vehicle 24. In some embodiments, the user interface 140 allows for continuous operation of the motor 136 to vary the position of the damper 16 through the range of open and closed positions.

Figure 9:
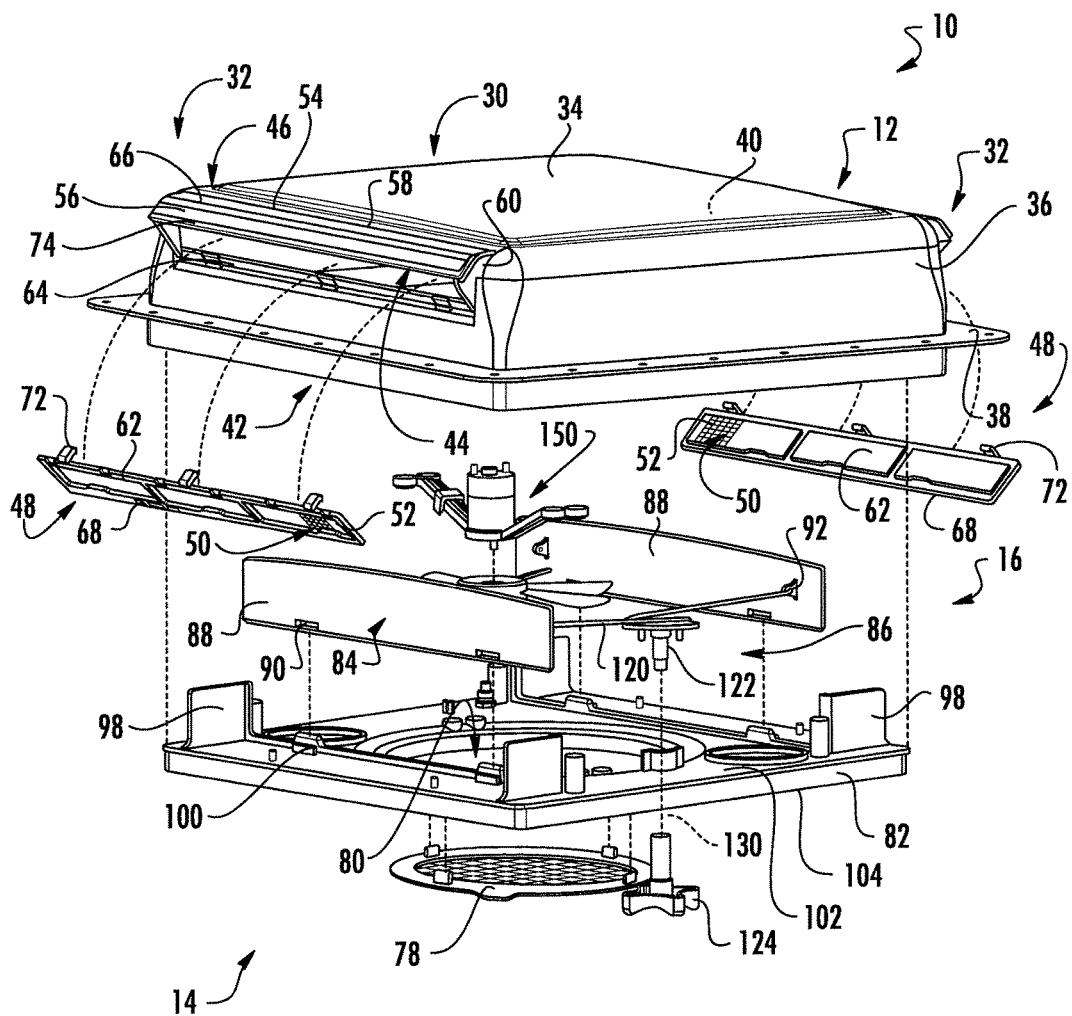
FIG. 9 is an exploded view of another embodiment of an air vent in accordance with the present disclosure, the air vent including a fan assembly for forcing air circulation between the interior and exterior of the vehicle.

In some embodiments, the air vent 10 includes a fan assembly 150 as shown in FIG. 9. The fan assembly 150 forces air circulation between the interior 20 and the exterior 22 of the vehicle 24. The fan assembly 150 is positioned in the damper chamber 28 and coupled to the body 82.

The damper 16 couples to the interior plate 14 and both the damper 16 and the interior plate 14 are sized to be received in the interior region 40. As such, the damper 16 and the interior plate 14 may be installed together after the cover 12 is positioned in the opening 18 and coupled to the vehicle 24. Additionally, other embodiments of the damper 16 and the interior plate 14 may be used with the cover 12. The damper 16 and the interior plate 14 may be uncoupled and removed from the cover 12 while the cover 12 remains coupled and installed to the vehicle 24.

Figure 10:
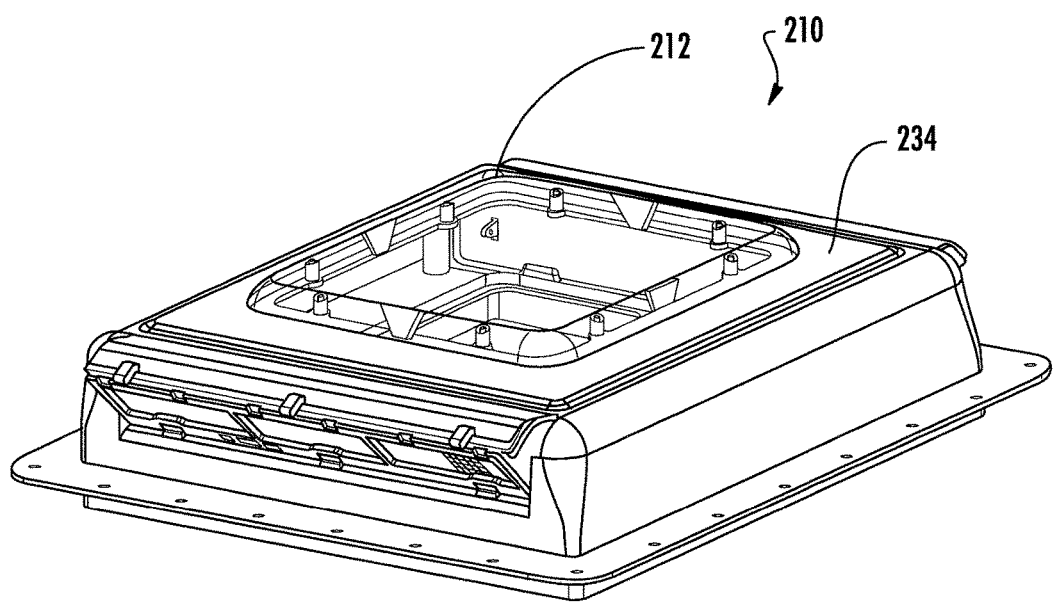
FIG. 10 is a perspective view of another embodiment of an air vent in accordance with the present disclosure, the air vent similar to the embodiment of FIG. 1; the embodiment of FIG. 10 including a translucent dome member secured to the ceiling of the air vent, the dome member permitting light to penetrate to illuminate the interior of the recreational vehicle.
Figure 11:
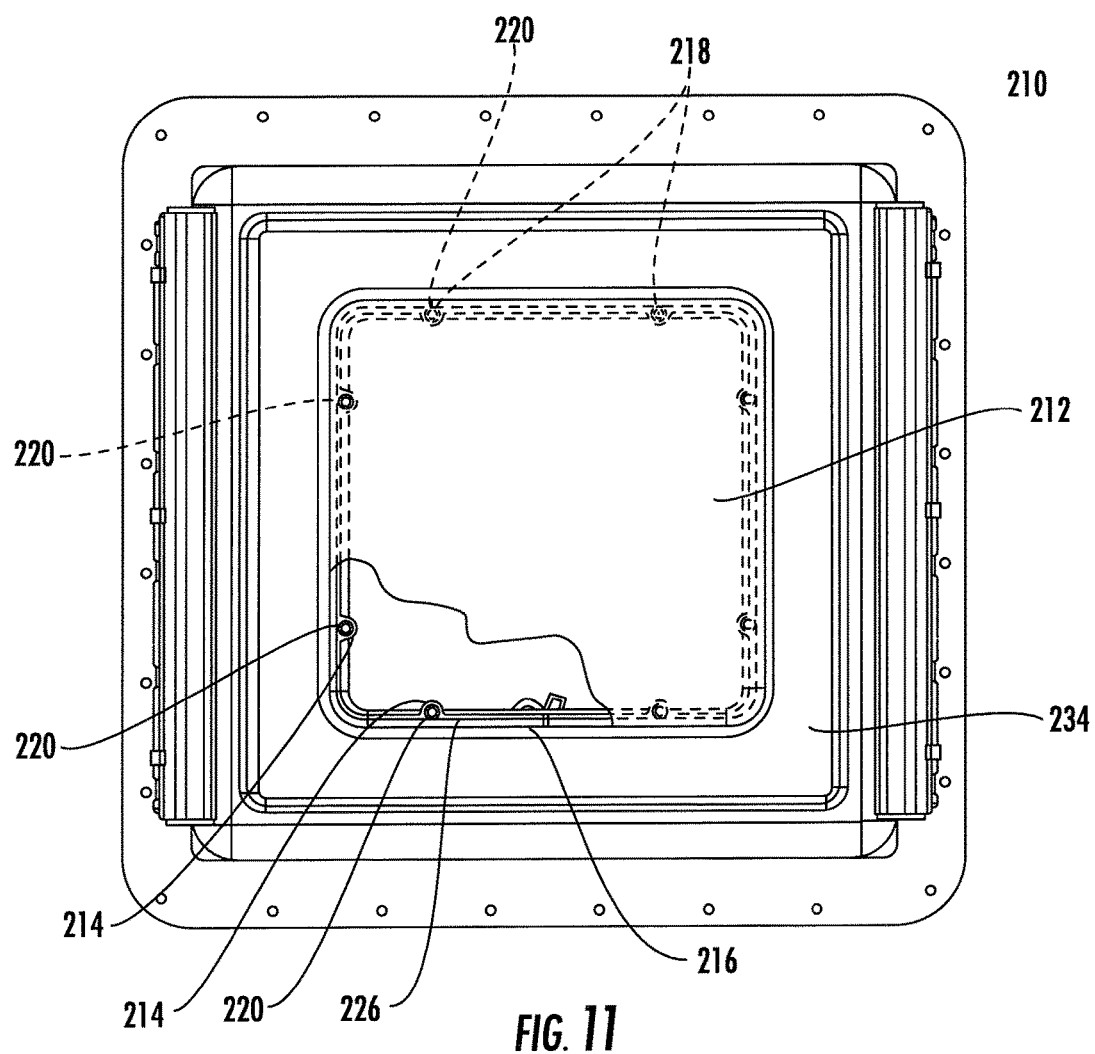
FIG. 11 is a top view of the air vent of FIG. 10.
Figure 12:
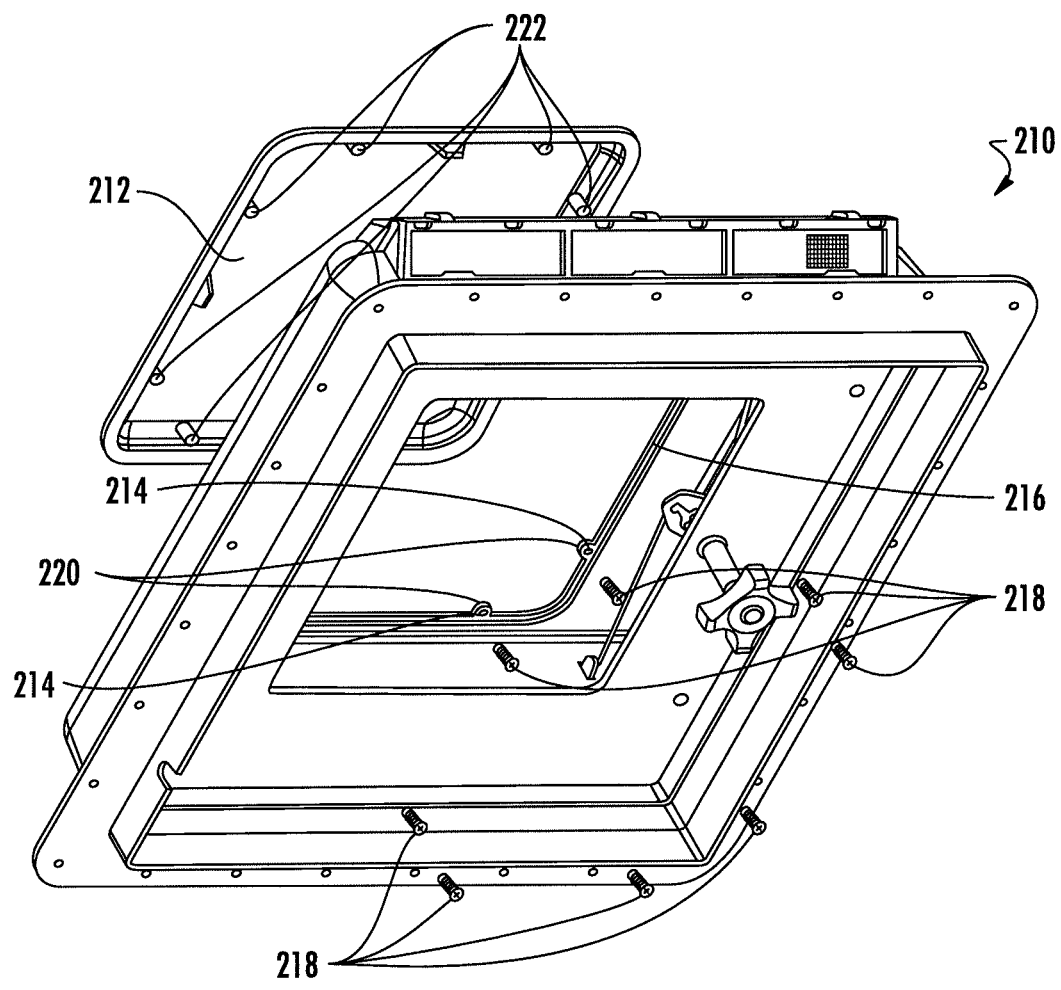
FIG. 12 is an exploded view of FIG. 10, showing the fasteners used to secure the translucent dome to the ceiling of the air vent.
Figure 13:
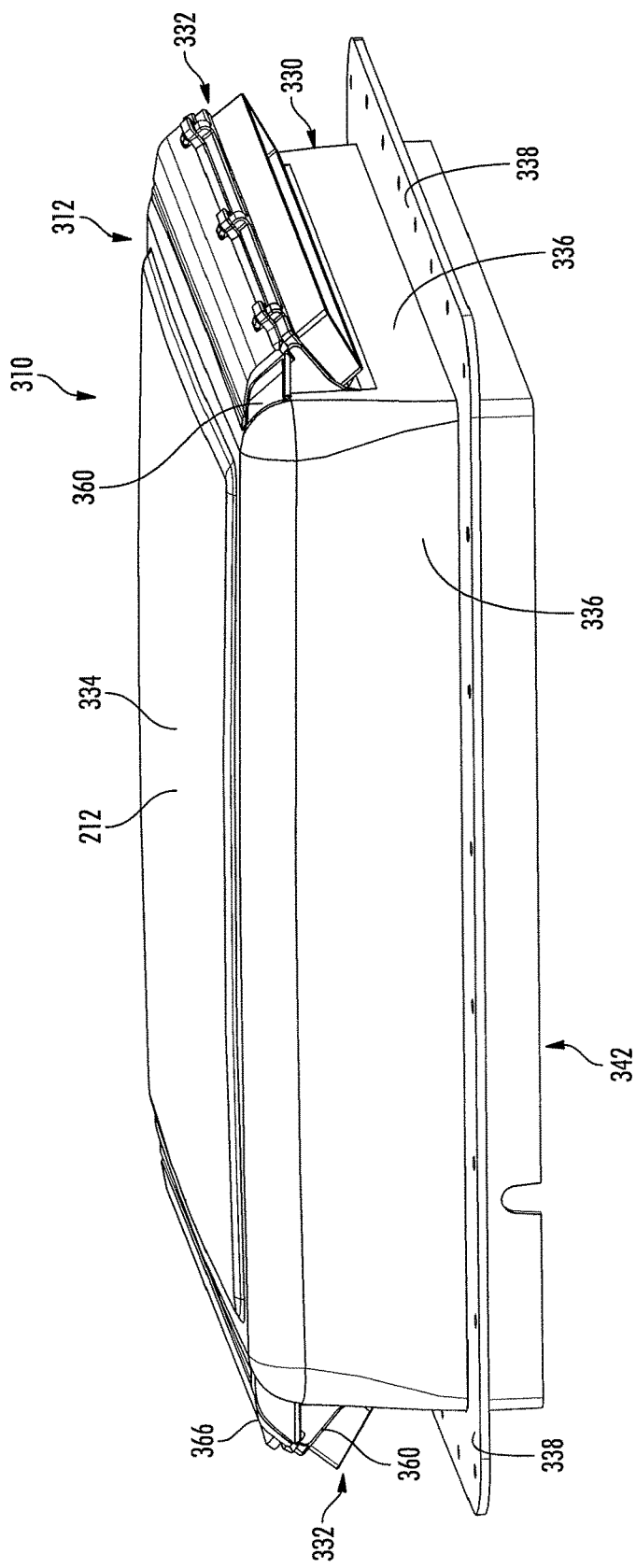
FIG. 13 is a perspective view of yet another embodiment of air vent, the air vent of FIG. 13 including extensions supported from awnings on the vent.

In another embodiment of an air vent 210, shown in FIGS. 10-12, the air vent 210 is similar to the air vent 10, but includes an aperture formed in the ceiling 234 and a translucent dome member 212 secured to the ceiling. While the ceiling 234 is different from air vent 10, in all other respects, air vent 210 functions similarly to air vent 10. The dome member 212 is a monolithic member that is molded of a translucent polymeric material. In some embodiments, the dome member 212 may be transparent. The dome member 212 may be tinted in various colors. The ceiling 234 is formed to include a number of tabs 214 spaced about a perimeter of an aperture 216 formed in the ceiling 234. A plurality of fasteners 218 are inserted through holes 220 in the tabs 214 and threaded into blind cavities 222 formed in the dome member 212. The blind cavities 222 in the illustrative embodiment are cylindrical and the fasteners 218 are of the thread cutting type and form their own threads in the cavities 222. In other embodiments, the cavities 222 may comprise inserts molded into the dome member 212 when it is formed. When the inserts are used, the fasteners may have a standard rolled thread. In other embodiments, other methods of fastening may be used to secure the dome member 212. For example, gluing, ultrasonic welding, and interference fit coupling may be used in some embodiments. Still other fastening techniques known by those of ordinary skill in the art may be employed.

To assemble the dome member 212 to the ceiling 234, the dome member 212 is placed on the outer side 224 of the ceiling 234 and the fasteners 218 are inserted from the inner side 226. The ceiling 234 if formed to include a ledge 226 about the perimeter of the aperture 216 upon which the dome member 212 is seated during installation. The ledge 226 interacts with the dome member 212 to form a seal. In some embodiments, a sealing material such as silicone caulk may be applied prior to assembly. In other embodiments, a pliable gasket may be applied to the perimeter of the dome member 212 to provide a seal.

In still another embodiment shown in FIGS. 13-17, an air vent 310 is similar to the air vent 10, but is modified to reduce the potential for ingress into the vehicle and permits recirculation within the vehicle if the damper is closed.

Figure 14:
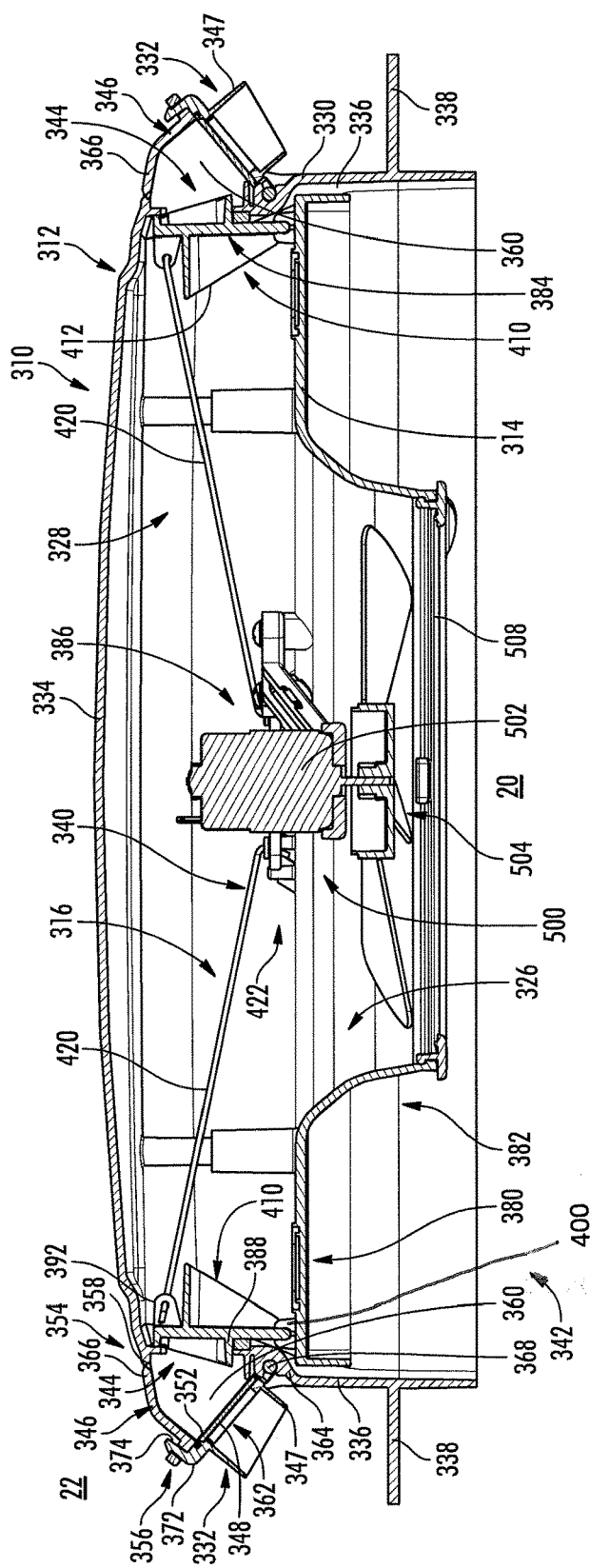
FIG. 14 is a cross-sectional view, similar to FIG. 6, of the embodiment of FIG. 13 taken along lines 14-14 in FIG. 13, FIG. 14 showing a damper in the closed position to block fluid communication between the interior and exterior of the vehicle.
Figure 15:
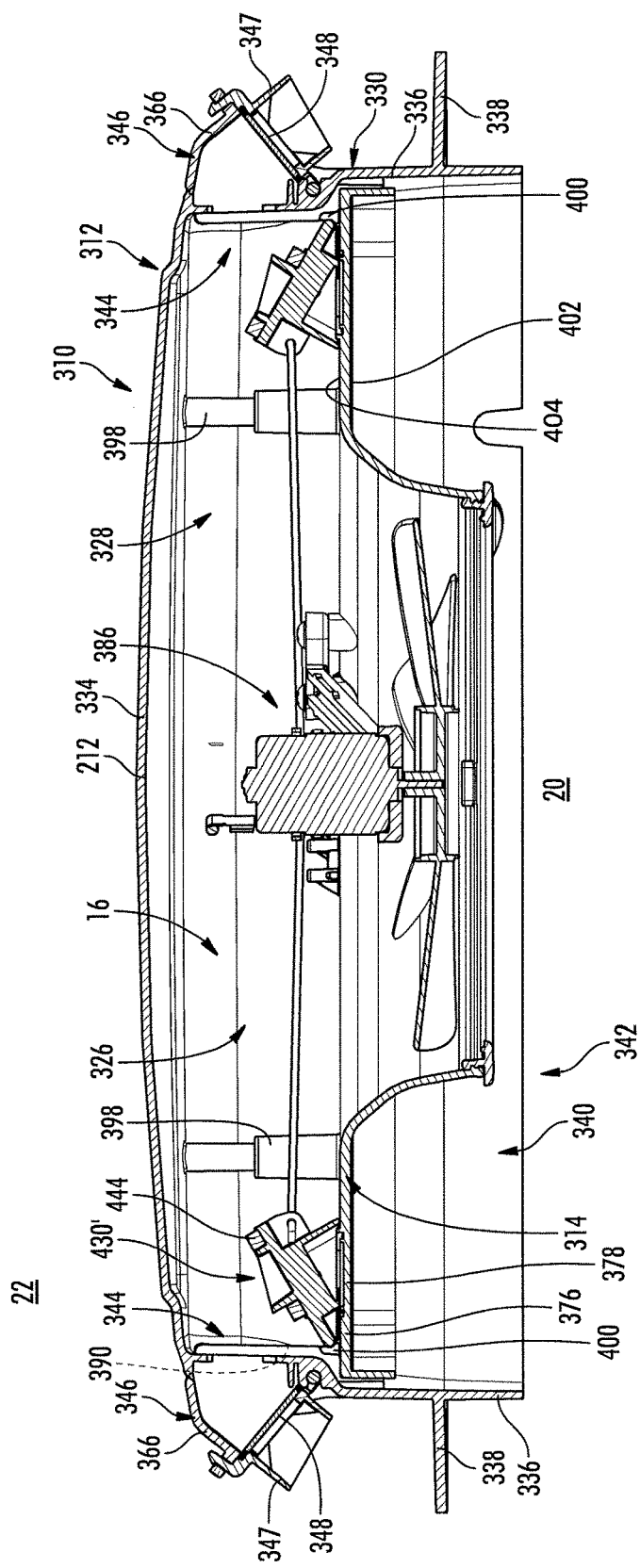
FIG. 15 is a view similar to the view of FIG. 14, however, the damper is shown in the open position in FIG. 15.

The air vent 310 includes a cover 312, an interior plate 314 (see FIG. 17), and a damper 316 as shown in FIG. 14. The cover 312 is received in the opening 18 as described with regard to air vent 10 to block water or debris from entering the vehicle 24 through the opening 18 and to provide a passage 326 to allow air to move between the interior 20 and the exterior 22 of the vehicle 24. The interior plate 314 is received in the cover 312 and cooperates with the cover 312 to define a damper chamber 328 sized to receive a portion of the damper 316. The damper 316 is movable between a closed, or blocked position, as shown in FIG. 14, and an open position, as shown in FIG. 15, to allow air to move through the passage 326. The position of the damper 316 is movable to a plurality of positions between the closed position of FIG. 14 and the fully open position of FIG. 15 to control air circulation between the interior 20 and the exterior 22.

The cover 312 includes a frame 330 and outlets 332. The frame 330 covers the opening 18 to block water or debris from entering the vehicle 24 through the opening 18. The outlets 332 are coupled to the frame 330 and form a portion of the passage 326 to allow fluid communication between the interior 20 and the exterior 22 of the vehicle 24. The outlets 332 block water or debris from entering the vehicle 24 through the passage 326. In the illustrative embodiment, the cover includes two outlets 332.

The frame 330 may comprise an air and water impermeable material to block air, water, and debris, for example, from entering the vehicle 24 through the opening 18. The frame 330 may comprise metal or a suitable plastic material, for example. The frame 330 includes a ceiling 334 (which includes a translucent dome member 212 in the embodiment of FIGS. 13-18), a number of sidewalls 336 extending downward from ceiling 334, and a skirt 338 coupled to the sidewalls 336.

The sidewalls 336 are formed to define an interior region 340 and a plate-receiving opening 342 that opens in to the interior region 340. The plate-receiving opening 342 is sized to receive the interior plate 314 and the damper 316. At least one sidewall 336 is formed to include an outlet opening 344. The outlet opening 344 opens into the interior region 340. The interior region 340, outlets 332, and interior plate 314 cooperate to define the passage 326.

The sidewalls 336 are formed to include two outlet openings 344. The two outlet openings 344 may allow a draft to pass through the interior region 340 to encourage air circulation between the interior 20 and the exterior 22 of the vehicle 24.

The skirt 338 is coupled to the sidewalls 336 and extends outward away from the sidewalls 336. The skirt 338 engages the vehicle 24 to block the air vent 10 from passing through the opening 18. The skirt 338 couples the air vent 310 to the vehicle 24 to maintain the air vent 310 in position relative to the vehicle 24 in manner similar to that of air vent 10 shown in FIG. 2. Water and debris are blocked from entering the interior 20 of the vehicle 24 through the opening 18 via the interface between the skirt 338 and the vehicle 24. In some embodiments, the skirt 338 includes an integral weatherproof seal. In other embodiments, a weatherproof seal is positioned between the skirt 338 and the vehicle 24.

The outlets 332 are coupled to the frame 330 to cover the outlet openings 344. Each outlet opening 344 is covered by an outlet 332. The outlets 332 allow air to communicate between the exterior 22 and the damper chamber 328 and, thus, the interior 20 when the damper 316 is in the open position as suggested in FIG. 15. The outlets 332 include an awning 346, an awning extension 347, and a vent grill 348 best seen in FIGS. 16-17. The awning 346 is coupled to the sidewall 336 of the frame 330 and, in cooperation with the awning extension 347, forms a rain covering over the vent grill 348 to block water or debris from entering the damper chamber 328 via the outlet opening 344. The vent grill 348 is formed to include a vent opening 350 to allow air to communicate between the interior 20 and the exterior 22. In the illustrative embodiment, the awning 346 and the frame 330 are monolithically formed. Monolithically forming the awning 346 and the frame 330 reduces one or more of the manufacture time, number of parts, assembly time, and cost of the cover 312. In other embodiments, the awning 346 and the frame 330 may be formed from a number of parts fastened together in any of a number of ways known in the art.

The awning 346 is coupled to the sidewall 336 and includes a flap 366, two end tabs 360, and a grill retainer 364. In the illustrative embodiment, the flap 366 is air and water impermeable. The flap 366 includes a fixed end 354, a free end 356, and a lip 374. The fixed end 354 is coupled to the sidewall 336 of the frame 330 above the outlet opening 344 along a pivot joint 358. The free end 356 is spaced apart from the fixed end 354 such that the flap 366 forms a cantilever. The lip 374 is coupled to the free end 356 and extends upwardly away from the free end 356. The free end 356 is pivoted downwardly about the pivot joint 358 and the extension 347 engages the lip 374 to maintain the flap 366 in a pivoted position as suggested in FIG. 14. The vent grill 348 is coupled to the extension 347. The flap 366 is held in the pivoted position to form the roof covering over the vent grill 348 and the outlet opening 344 to block water or debris from entering the damper chamber 328 via the vent grill 348 or the outlet opening 344.

The end tabs 360 are coupled to the sidewall 336 on both sides of the outlet opening 344. In the illustrative embodiment, the end tabs 360 are air and water impermeable. The end tabs 360 extend away from the sidewall 336 and engage the flap 366 and the vent grill 348. The end tabs 360, flap 366, and vent grill 348 cooperate to form a housing surrounding the outlet opening 344 to block water or debris from entering the outlet opening 344.

A grill retainer 364 is coupled to the sidewall 336 and extends along a bottom of the outlet opening 344. The grill retainer 364 is configured to pivotably couple to the extension 347 such that the extension 347 may pivot relative to the frame 330.

The extension 347 is formed to define the vent opening 350 to allow air to communicate between the exterior 22 and the damper chamber 328. The extension 347 is coupled to the awning 346 to cover the outlet opening 344 and to maintain the awning 346 in a stationary position after the flap 366 has been pivoted downward. The vent grill 348 includes a face 362, awning tabs 372, and frame pins 368. The face 362 is formed to define the vent opening 350 to allow air to circulate between the interior 320 and the exterior 322 via the passage 326. The awning tabs 372 couple the vent grill 348 to the flap 366 of the awning 346. The frame pins 368 couple the vent grill 348 to the grill retainer 364.

The face 362 covers the outlet opening 344. The face 362 is generally flat and air and water impermeable to block water or debris from entering the interior 320 via the outlet opening 344. The face 362 engages the awning 346 to form a weather blocking seal between the vent grill 348 and the awning 346. The face 362 is formed to include the vent opening 350 to allow air to communicate between the exterior 322 and the interior 320 via the passage 326. In the illustrative embodiment, the vent opening 350 is covered by an air permeable vent 352. The vent 352 may be an air permeable mesh or plastic grill. In some embodiments, the face 362 is generally mesh and air permeable. The face 362 is angled downward relative to the sidewall 336 of the frame 330. In the illustrative embodiment, the face 362 and the frame 330 form about a 345 degree angle.

The awning tabs 372 of the extension 347 are coupled to the face 362 and engage the lip 374 of the flap 366 when the flap 366 is pivoted downward as suggested in FIGS. 14 and 15. When the vent grill 348 is coupled to the awning 346, the awning tabs 372 engage the lip 374 to block the flap 366 from pivoting upward and, as such, maintain the flap 366 in a stationary position.

The frame pins 368 are formed in the face 362 and engage the grill retainer 364 of the awning 346 to couple the vent grill 348 to the awning 346. When the frame pins 368 are received by the grill retainer 364 and the awning tabs 372 are not engaged with the lip 374, the extension 347 is free to pivot relative to the frame 330. When the frame pins 368 are received by the grill retainer 364 and the awning tabs 372 are engaged with the lip 374, the extension 347 is maintained in a stationary position relative to the awning 346 and the frame 330.

Figure 16:
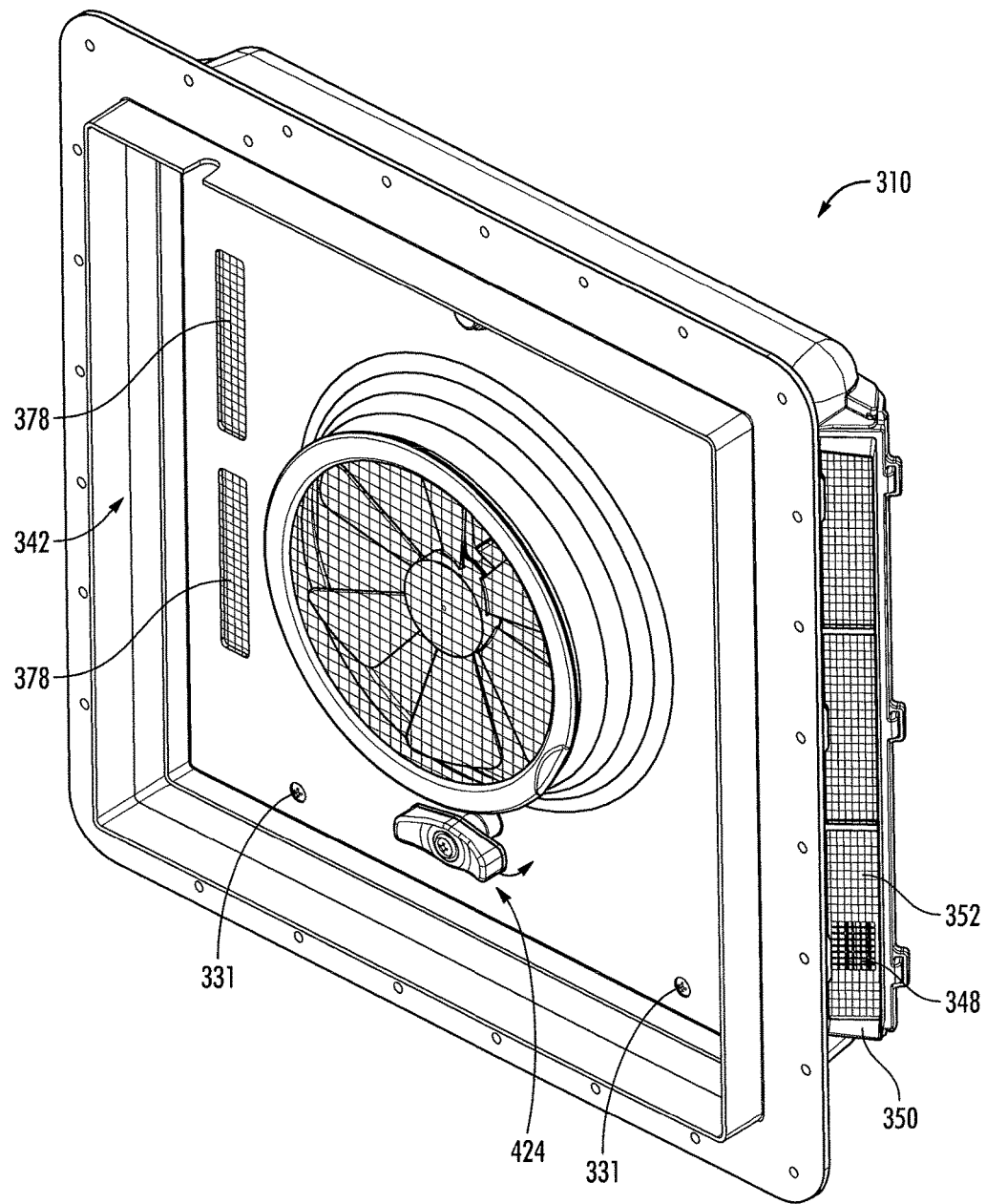
FIG. 16 is a perspective view of the bottom of the air vent embodiment of FIG. 13.
Figure 17:
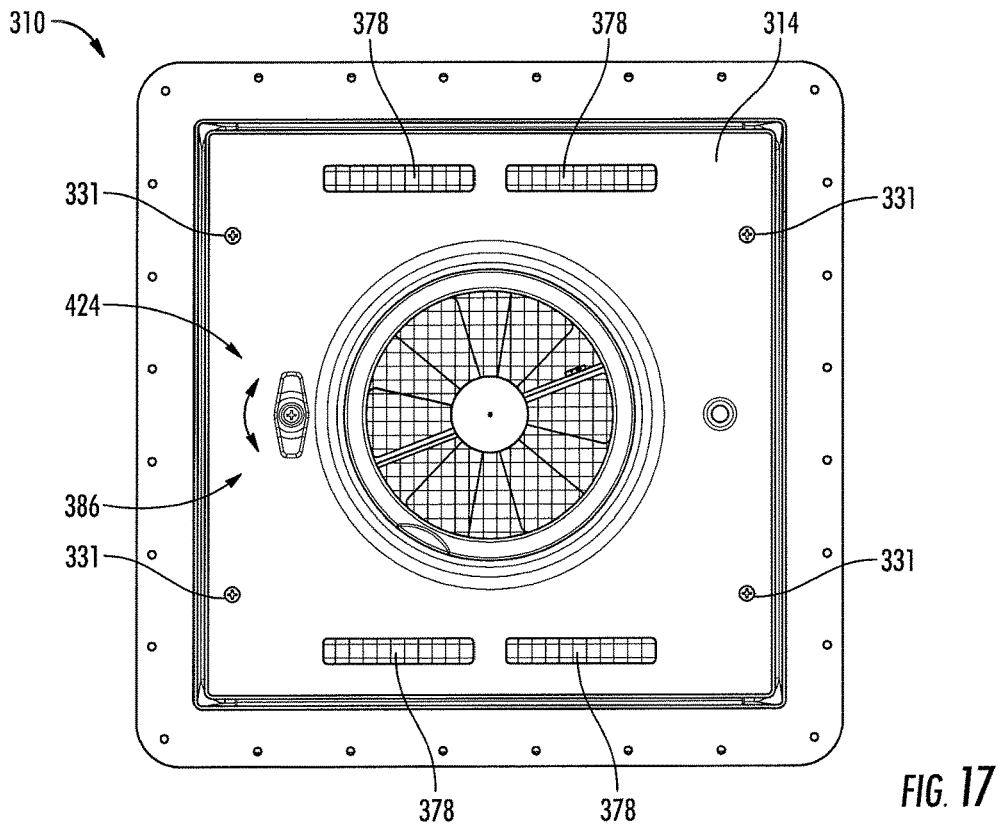
FIG. 17 is a bottom plan view of the air vent embodiment of FIG. 13.

The interior plate 314 is received in the interior region 340 formed in the cover 312 and cooperates with the cover 312 to define the damper chamber 328 as shown in FIGS. 16 and 17. The interior plate 314 includes a base 376 and a plurality of screens 378. The base 376 couples to the frame 330 to maintain the interior plate 314 in position relative to the frame 330. The screen 378 allows fluid communication between the interior 20 and the damper chamber 328.

The base 376 is sized to be received in the plate-receiving opening 342 to cover the plate-receiving opening 342. The base 376 includes a body 382, a number of frame couplers 398, and a damper retainer 400. The body 382 supports the frame couplers 398, damper retainer 400, and screen 378. The frame couplers 398 couple the base 376 to the frame 330 through fasteners 331, best seen in FIGS. 16 and 17. The damper retainer 400 couples the damper 316 to the body 382.

The body 382 is sized to be received in the plate-receiving opening 342 and engages the sidewalls 336 as shown in FIG. 14. The body 382 is formed to define a screen-receiving opening 380 sized to receive the screen 378. The body 382 includes an upper surface 402 and a lower surface 404. The upper surface 402 is coupled to the frame couplers 398 and the damper retainer 400.

The frame couplers 398 are coupled to the body 482 and extend upward away from the body 482 as shown in FIG. 14. The frame couplers 398 couple the interior plate 314 to the cover 312. The frame couplers 398 space the base 376 apart from the ceiling 334 of the cover 312 so that the damper chamber 328 is properly sized to receive the damper 316.

The damper retainer 400 is coupled to the body 382 as shown in FIG. 14. The damper retainer 400 is pivotably coupled to slats 384 included in the damper 316. The damper retainer 400 is formed to define a through hole sized to receive a driver 386 included in the damper 316.

The screens 378 mate with the body 382 to cover the screen-receiving openings 380. The screens 378 are air permeable to allow air to communicate between the interior 320 and the damper chamber 328 when the damper is in the closed position shown in FIG. 14. In some embodiments, the screen 378 comprises a mesh material. In some embodiments, the screen 378 comprises a metal or plastic material.

In the illustrative embodiment of FIGS. 13-17, the air vent 310 includes a fan assembly 500. The fan assembly 500 includes a motor 502 and a blade assembly 504. The motor 502 is reversible and operable to pull air into the interior region 340 from the interior 20 of the vehicle 24 or pull air from the interior region 340. When the damper 316 is closed, the fan assembly 500 recirculates air within the vehicle 24.

When the damper 316 is in the open position, air is allowed to circulate between the interior 320 and the exterior 322 through the passage 326 by passing through the screen 378, damper chamber 328, and vent opening 350 as shown in FIG. 15. The fan assembly 500 includes a grill 508 through which the air passes. In some embodiments, the grill 508 may be removable.

The damper 316 selectively blocks or allows circulation between the interior 320 and the exterior 322 by blocking or allowing air to pass through the passage 326 as suggested in FIG. 15. The damper 316 is sized to be received in the plate-receiving opening 342 and is positioned in the damper chamber 328. The damper 316 is movable between the open position and the closed, or blocking position. In the open position, air is allowed to circulate between the interior 20 and the exterior 22 via the air vent 310 through the fan grill 508. In the closed position, air is blocked from circulating between the interior 20 and the exterior 22 via the air vent 310 but may be circulated through the fan assembly 500 and the screens 378. The damper 316 is configured to be maintained in a number of open positions between a fully open position and a fully closed position to thereby regulate the airflow. In the illustrative embodiment, the damper 316 is configured to be maintained in an infinite number of open positions between the fully open position and the fully closed position. In other embodiments, the damper 316 is configured to be maintained in a discrete number of open positions.

The damper 316 includes slats 384 and the driver 386 as shown in FIGS. 14-15. The slats 384 are movable between an upright position to block air from moving through the passage 326 as suggested by FIG. 14 and an angled position to allow air to move through the passage 326 as suggested in FIG. 15. The driver 386 is operated by a user to selectively move the slats 384 between the upright and angled positions. In the illustrative embodiment, the damper 316 includes two slats 384 and a single slat 384 is used in conjunction with each outlet opening 344. The slats 384 are substantially similar and, as such, only a single slat 384 will be described in detail.

The slat 384 is in the upright position when the damper 316 is in the closed position as shown in FIG. 14. The slat 384 is in the angled position when the damper 316 is in the open position as suggested in FIG. 15. The slat 384 is air and water impermeable and sized to cover the outlet opening 344. In the upright position, the slat 384 covers the outlet opening 344 and blocks air from moving between the interior 320 and the exterior 22 through the passage 326. In the angled position, at least a portion of the slat 384 is moved away from the outlet opening 344 to uncover the outlet opening 344 and air is allowed to move between the interior 20 and the exterior 22 through the passage 326. The slat 384 is configured to be maintained in a number of positions between the upright and angled positions to thereby regulate the airflow. In the fully open position shown in FIG. 15, a housing 385 of the slat 384 covers the screens 378 to prevent air flow through the screens 378.

The slat 384 includes a wall 388, pins 390, and rod joints 392 as shown in FIGS. 14-15. The wall 388 is air and water impermeable and sized to completely cover the outlet opening 344. The pins 390 pivotably couple the slat 384 to the damper retainer 400. One of the rod joints 392 couple the slat 384 to the driver 386 so that the driver 386 may push and pull the slat 384 to selectively move the slat 384 between the upright and angled positions. The slat 384 also includes a stand-off 410 that extends from the wall 388 and is formed at an angle to an inner face 394 of the wall 388 with a surface 412 that engages the upper surface 414 of the interior plate 314 to overly the screen-receiving opening 380 when the damper 316 is in the fully opened position shown in FIG. 15. When the damper 316 is fully closed, air flow through the screen-receiving opening 380 is blocked.

Figure 18:
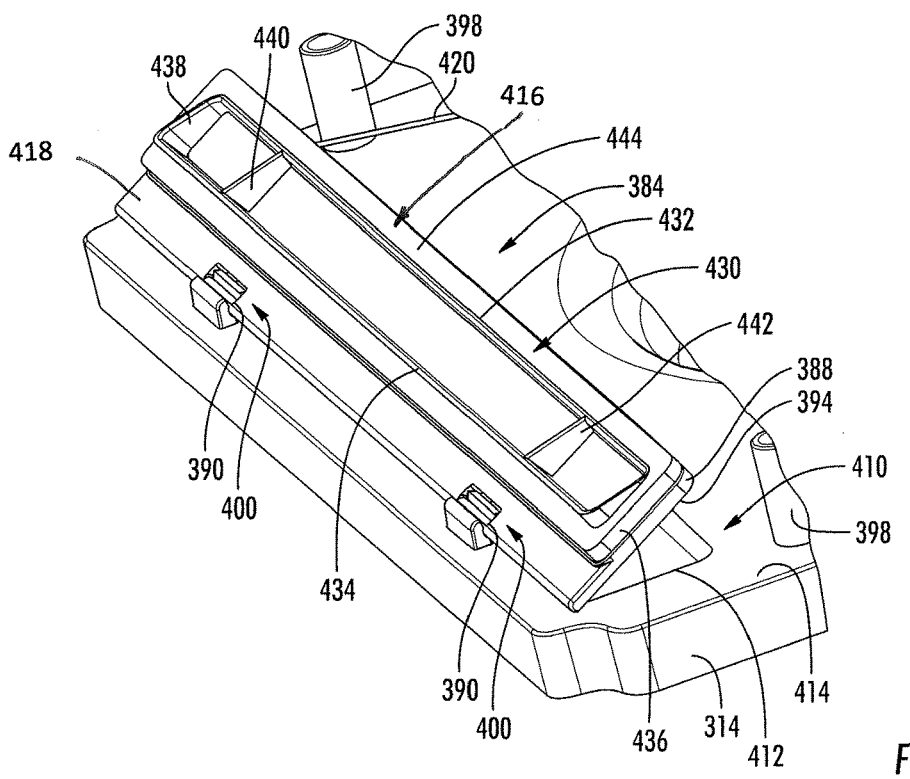
FIG. 18 is a perspective view with portions removed and other portions cut-away, FIG. 18 depicting the structure of a slat and the corresponding mounting structure of the slat of a damper of the air vent embodiment of FIG. 13.

The slat 384 also includes a guide 416 that extends from an outer face 418 of the wall 388 as shown in FIG. 18. The guide 416 has a continuous wall 430 that extends around the periphery of the guide 416 with an upper portion 432 of the wall 430 being shorter than a lower portion 434 of the wall 430. Ramp segments 436 and 438 extend between the upper portion 432 and the lower portion 434. A pair of ribs 440 and 442 each also extends between the upper portion 432 and lower portion 434 as shown in FIG. 18. The shape of the wall 430 assists with positioning the guide 416 in the outlet opening 344 as the slat 384 is moved to the closed position shown in FIG. 14. A gasket 444 is positioned on the slat 384 surrounding the wall 430 of the guide 416 so that when the slat 384 is moved to the closed position, the gasket 444 seals around the guide 416. As can be seen in FIGS. 14 and 15, the pivot axis formed by the damper retainer 400 and the pins 390 is offset from the sidewall 336 such that the gasket 444 is positioned to seal against the sidewall 336 and prevent a flow of air between the interior region 340 and the exterior.

The driver 386 is configured to be rotated in a first direction to move the slats 384 to the upright position when the damper 316 is in the closed position as suggested in FIG. 14. The driver 386 is configured to be rotated in a second direction to move the slats 384 to the angled position when the damper 316 is in the open position as suggested in FIG. 15. The driver 386 is rotatable to move and maintain the slats 384 in a number of positions between a fully angled position and the upright position to thereby regulate the airflow. In the illustrative embodiment, the driver 386 is rotatable to maintain the slats 384 in an infinite number of positions between the fully angled position and the upright position. In other embodiments, the driver 386 is rotatable to maintain the slats 384 in a discrete number of angled positions.

The driver 386 includes a number of rods 420, a crank 422, and a handle 424 as shown in FIG. 14 and similar to the driver 86. The rods 420 are pivotably coupled to the rod joints 392 and the crank 422 as shown in FIG. 14. The air vent 310 includes a translucent dome member 212 as described above with regard to the air vent 210. However, it should be understood that the cover 312 may be constructed similarly to the air vent 10, with the translucent dome member 212 omitted and the cover 312 being a monolithic opaque member.

Similarly, the driver 386 may be modified to include an actuator such as the actuator 136 which is controlled by a controller such as controller 138 under the direction of a user through a user interface such as user interface 140. Still further, the fan assembly 500 may be omitted and the air vent 310 may simply provide for a natural flow of air therethrough.

Although certain illustrative embodiments have been described in detail above, variations and modifications exist within the scope and spirit of this disclosure as described and as defined in the following claims.

The invention claimed is:
1. An air vent comprising:
a cover including a ceiling, the ceiling have an aperture formed therethrough, the cover further including a number of sidewalls extending from the ceiling, the number of sidewalls formed to define a first outlet opening, a translucent dome secured to the cover and positioned in the aperture formed in the ceiling, an interior plate coupled to the cover, the interior plate and the cover cooperating to define a damper chamber, the interior plate formed to define a screen-receiving opening that opens into the damper chamber, the first outlet opening opens into the damper chamber, and the screen-receiving opening is transverse to the first outlet opening, and a damper coupled to the interior plate and positioned in the damper chamber, the damper selectively moveable between a closed position blocking fluid communication through the first outlet opening and an open position allowing fluid communication through the first outlet opening, wherein the damper includes a first slat and a driver, the first slat is configured to move between a first position covering the first outlet opening when the damper is in the closed position and a second position uncovering the first outlet opening when the damper is in the open position, and the driver is coupled to the first slat and configured to move the first slat between the first and second positions.

2. The air vent of claim 1, wherein the cover further includes a first outlet coupled to one of the sidewalls to cover the first outlet opening, the first outlet includes an air permeable vent grill removably coupled to the sidewall and a water impermeable awning coupled to the cover and the vent grill, and the awning extends away from the sidewall to block precipitation and debris from entering the first outlet opening.

3. The air vent of claim 2, wherein the number of sidewalls are formed to define a second outlet opening, the damper includes a second slat, the second slat is configured to move between a first position covering the second outlet opening when the damper is in the closed position and a second position uncovering the second outlet opening when the damper is in the open position.

4. The air vent of claim 3, wherein the first and second slats are configured to be maintained in a number of positions between the first and second positions.

5. The air vent of claim 3, wherein the driver is coupled to the second slat and configured to move the second slat between the first and second positions.

6. The air vent of claim 5, wherein the cover further includes a second outlet coupled to one of the sidewalls to cover the second outlet opening, the second outlet includes an air permeable vent grill removably coupled to the sidewall and a water impermeable awning coupled to the cover and the vent grill, and the awning extends away from the sidewall to block precipitation and debris from entering the second outlet opening.

7. An air vent comprising:

a cover configured to be received in an opening formed in a vehicle, the cover including a continuous ceiling and a number of sidewalls extending downward away from the ceiling, the ceiling and sidewalls cooperating to define an interior region and a plate-receiving opening that opens into the interior region, the cover formed to define a vent opening that opens into the interior region, and wherein the interior region, plate-receiving opening, and the vent opening cooperate to define a passage for air to communicate between an interior and an exterior of the vehicle, a plate positioned in the plate receiving opening, the plate including a central opening and at least one peripheral opening, and a damper positioned in the interior region, the damper selectively moveable between a closed position blocking fluid communication through the vent opening and an open position allowing fluid communication through the vent opening, wherein when the damper is in the closed position, through the interior region between the central opening and the at least one peripheral opening, wherein the damper includes a first slat and a driver, the first slat is configured to move between a first position covering the first outlet opening when the damper is in the closed position and a second position uncovering the first outlet opening when the damper is in the open position, and the driver is coupled to the first slat and configured to move the first slat between the first and second positions.

8. The air vent of claim 7, wherein the cover further includes a first outlet coupled to one of the sidewalls to cover the first outlet opening, the first outlet includes an air permeable vent grill removably coupled to the sidewall and a water impermeable awning coupled to the cover and the vent grill, and the awning extends away from the sidewall to block precipitation and debris from entering the first outlet opening.

9. The air vent of claim 8, wherein the wherein the slat includes a guide that engages with the opening to position the slat when the damper is in the closed position.

10. The air vent of claim 9, wherein the damper further includes a gasket that is positioned adjacent the guide, the gasket positioned between a surface of the slat and the sidewall to provide a seal.

11. The air vent of claim 10, wherein when the damper is in the closed position, the surface of the slat is spaced apart from the sidewall.

12. The air vent of claim 11, wherein the slat is formed to include a stand-off that engages the plate when the damper is in the fully opened position.

13. The air vent of claim 8, wherein the number of sidewalls are formed to define a second outlet opening, the damper includes a second slat, the second slat is configured to move between a first position covering the second outlet opening when the damper is in the closed position and a second position uncovering the second outlet opening when the damper is in the open position.

14. The air vent of claim 13, wherein the first and second slats are configured to be maintained in a number of positions between the first and second positions.

15. The air vent of claim 13, wherein the driver is coupled to the second slat and configured to move the second slat between the first and second positions.

16. The air vent of claim 15, wherein the cover further includes a second outlet coupled to one of the sidewalls to cover the second outlet opening, the second outlet includes an air permeable vent grill removably coupled to the sidewall and a water impermeable awning coupled to the cover and the vent grill, and the awning extends away from the sidewall to block precipitation and debris from entering the second outlet opening.

17. The air vent of claim 13, wherein the slat includes a guide that engages with the opening to position the slat when the damper is in the closed position.

18. The air vent of claim 17, wherein the damper further includes a gasket that is positioned adjacent the guide, the gasket positioned between a surface of the slat and the sidewall to provide a seal.

19. The air vent of claim 18, wherein when the damper is in the closed position, the surface of the slat is spaced apart from the sidewall.

20. The air vent of claim 19, wherein the slat is formed to include a stand-off that engages the plate when the damper is in the fully opened position.

* * * * *